US010345912B2

(12) United States Patent
Liu et al.

(10) Patent No.: US 10,345,912 B2
(45) Date of Patent: Jul. 9, 2019

(54) CONTROL METHOD, CONTROL DEVICE, DISPLAY DEVICE AND ELECTRONIC DEVICE

(75) Inventors: Junfeng Liu, Beijing (CN); Qianying Wang, Beijing (CN); Yuan Gao, Beijing (CN)

(73) Assignees: LENOVO (BEIJING) CO., LTD., Haidian District, Beijing (CN); BEIJING LENOVO SOFTWARE LTD., Haidian District, Beijing (CN)

( * ) Notice: Subject to any disclaimer, the term of this patent is extended or adjusted under 35 U.S.C. 154(b) by 172 days.

(21) Appl. No.: 14/003,687

(22) PCT Filed: Mar. 7, 2012

(86) PCT No.: PCT/CN2012/072033
§ 371 (c)(1),
(2), (4) Date: Sep. 6, 2013

(87) PCT Pub. No.: WO2012/119548
PCT Pub. Date: Sep. 13, 2012

(65) Prior Publication Data
US 2013/0342491 A1 Dec. 26, 2013

(30) Foreign Application Priority Data

Mar. 7, 2011 (CN) .......................... 2011 1 0054512
Mar. 14, 2011 (CN) .......................... 2011 1 0061129

(51) Int. Cl.
*G06F 3/01* (2006.01)
*G06F 3/041* (2006.01)
*G06F 3/0488* (2013.01)

(52) U.S. Cl.
CPC .............. *G06F 3/017* (2013.01); *G06F 3/041* (2013.01); *G06F 3/0488* (2013.01); *G06F 2203/04101* (2013.01)

(58) Field of Classification Search
CPC ................. G06F 3/0485; G06F 3/0488; G06F 2203/04101; G06F 3/0486
See application file for complete search history.

(56) References Cited

U.S. PATENT DOCUMENTS 8,160,652 B2 4/2012 Nam
2005/0226505 A1* 10/2005 Wilson ................. G06F 3/0425
382/180

(Continued)

FOREIGN PATENT DOCUMENTS

CN 101515213 8/2009
CN 101540794 9/2009
(Continued)

OTHER PUBLICATIONS

PCT/CN2012/072033 International Search Report dated Jun. 14, 2012 (two pages).
(Continued)

*Primary Examiner* — Dong Hui Liang
(74) *Attorney, Agent, or Firm* — Brinks Gilson & Lione; John C. Freeman

(57) ABSTRACT

A control method for an electronic device comprising a sensor unit having a first detection range and a second detection range measured from the electronic device, and the second detection range being smaller than the first detection range. The method includes: detecting a 3D movement track of an operation body when the relative distance between the operation body and the electronic device is smaller than the first detection range, the 3D movement track being a continuous movement track having one end between the first and second detection range and the other end equal to or smaller than the second detection range; generating a status change signal when the operation body reaches close to or moves away from the second detection range of the sensor unit; executing a corresponding control command according to the 3D movement track and the status change signal.

22 Claims, 14 Drawing Sheets

(56) References Cited

U.S. PATENT DOCUMENTS

| | | | |
|---|---|---|---|
| 2007/0006099 A1* | 1/2007 | Johnson | G06F 3/0485 |
| | | | 715/828 |
| 2008/0165145 A1* | 7/2008 | Herz | G06F 3/04847 |
| | | | 345/173 |
| 2008/0165160 A1* | 7/2008 | Kocienda | G06F 3/04883 |
| | | | 345/175 |
| 2009/0219255 A1 | 9/2009 | Woolley et al. | |
| 2009/0239588 A1 | 9/2009 | Nam | |
| 2009/0265670 A1 | 10/2009 | Kim et al. | |
| 2010/0095206 A1 | 4/2010 | Kim | |
| 2010/0171716 A1 | 7/2010 | Ikeda et al. | |
| 2010/0188423 A1 | 7/2010 | Ikeda et al. | |
| 2010/0259562 A1 | 10/2010 | Miyazawa et al. | |
| 2011/0050629 A1* | 3/2011 | Homma | G06F 3/0414 |
| | | | 345/174 |
| 2011/0090255 A1* | 4/2011 | Wilson | G06F 3/04817 |
| | | | 345/647 |
| 2011/0175831 A1* | 7/2011 | Miyazawa | G06F 3/041 |
| | | | 345/173 |
| 2012/0054670 A1* | 3/2012 | Rainisto | G06F 3/04883 |
| | | | 715/784 |
| 2012/0062604 A1* | 3/2012 | Lobo | G06F 3/0485 |
| | | | 345/684 |

FOREIGN PATENT DOCUMENTS

| | | |
|---|---|---|
| CN | 101627361 | 1/2010 |
| CN | 101859221 | 10/2010 |
| CN | 101866234 | 10/2010 |
| CN | 101866262 | 10/2010 |
| CN | 101952792 | 1/2011 |

OTHER PUBLICATIONS

First Office Action dated Jul. 25, 2014 in corresponding Chinese priority application CN 201110054512.2 (17 pages including English translation).

International Preliminary Report on Patentability for PCT/CN2012/072033 dated Sep. 10, 2013, 12 pages.

* cited by examiner

CONTROL METHOD, CONTROL DEVICE, DISPLAY DEVICE AND ELECTRONIC DEVICE

This application claims priority to International Application No. PCT/CN 2012/072033 filed Mar. 7, 2012; Chinese application No. 201110054512.2 filed Mar. 7, 2011; and Chinese application No. 201110061129.X filed Mar. 14, 2011, the entire contents of each are incorporated herein by reference.

BACKGROUND

Embodiments of the present disclosure relate to a field of an electronic device. More particularly, the present disclosure relates to a control method applicable to an electronic device and a corresponding control device, a method for moving a display object applicable to an electronic device and a corresponding display device, and an electronic device.

At present, a variety of electronic devices with a touch display screen such as a cell phone, a portable music player and a portable computer have been widely applied. In these portable electronic devices, a display screen and a touch sensor unit are always placed in an overlapped manner to form a touch display screen. The touch sensor unit is used for receiving an input of a user so as to facilitate the user's operation. The touch sensor unit can comprise a touch sensing area constituted of sensor elements such as capacitive touch sensors or resistant touch sensors and so on. The user of such type of electronic devices contacts the touch display screen through certain operation bodies (e.g., finger tip, pen point). The user can perform actions such as clicking, double clicking, dragging, etc. on a touch control area of the electronic device to realize corresponding control functions. In other words, the electronic device senses a contact of an operation body with the touch display screen through the contact sensor unit and performs a corresponding operation in response to such contact.

With a development of technology, processing capacity of a processor is improved, and functions that a portable electronic device can provide for the user are gradually increasing. However, most of existing electronic devices with a touch sensor unit merely support contact operation. That is, the electronic device performs a corresponding operation only when it senses that the operation body contacts with the touch display screen, but the above contact operations such as clicking, double clicking and dragging and so on already cannot meet the user's requirement for increasingly diversified operations, which causes inconvenience in some cases.

For example, in an unlock operation of some electronic devices, the user needs to move a display object (e.g., a sliding block) from a first position to a second position on the touch display screen. For this purpose, the user has to make a sliding gesture, and a range of the sliding gesture is equal to a distance between the second position and the first position. The distance is a relatively long distance, and thus does not conform to operating habits of the user in a case of one-handed operation, which is easy to make the user tired, thus bringing bad experience for the user.

For another example, in a common list or webpage scrolling operation of the electronic device, in order to view a content currently not displayed on the touch display screen, in one implementation mode, the user needs to keep making the sliding gesture until the desired content is displayed on the touch display screen. In a case of a relatively long distance, it is also easy for such implementation mode to make the user tired, thus causing bad experience for the user. In another implementation mode, the user needs to make a flinging gesture, such that the content displayed on the touch display screen scrolls quickly and gradually stops scrolling at a certain negative acceleration speed. In such implementation mode, the user cannot intuitively recognize a relationship between the speed of the gesture and the scrolling speed of the content while making the gesture, so that the desired content cannot be displayed on the touch display screen accurately.

SUMMARY

The embodiments of the present disclosure aim at providing a control method applicable to an electronic device and a corresponding control device, and an electronic device, so as to solve the above problem.

One embodiment of the present disclosure provides a control method applicable to an electronic device. The electronic device comprises a sensor unit, wherein the sensor unit has a first detection distance and a second detection distance. In particular, the first detection distance and the second detection distance are distances relative to the electronic device, and the second detection distance is smaller than the first detection distance. The control method comprises: detecting a 3D movement track of an operation body when a relative distance of the operation body relative to the electronic device is smaller than the first detection distance, wherein the 3D movement track is a continuous movement track having one end between the first and the second detection distances and the other end equal to or smaller than the second detection distance; generating a status change signal when the operation body gets close to the second detection distance of the sensor unit or moves away from the second detection distance; dividing the 3D movement track according to the status change signal to obtain a first track when the relative distance is equal to or smaller than the second detection distance and a second track when the relative distance is greater than the second detection distance; and executing a corresponding control command according to the first track and the second track.

Another embodiment of the present disclosure provides a control device applicable to an electronic device. The control device comprises: a sensor unit having a first detection distance and a second detection distance and being configured to detect a 3D movement track of an operation body when a relative distance of the operation body relative to the electronic device is smaller than the first detection distance, wherein the first detection distance and the second detection distance are distances relative to the electronic device, the second detection distance is smaller than the first detection distance, and the 3D movement track is a continuous movement track having one end between the first and the second detection distances and the other end equal to or smaller than the second detection distance; a status detection unit being configured to generate a status change signal when the operation body gets close to the second detection distance of the sensor unit or moves away from the second detection distance; a track division unit being configured to divide the 3D movement track according to the status change signal to obtain a first track when the relative distance is equal to or smaller than the second detection distance and a second track when the relative distance is greater than the second detection distance; and an execution unit being configured to execute a corresponding control command according to the first track and the second track.

Another embodiment of the present disclosure provides an electronic device, comprising: a sensor unit and a processing unit. The sensor unit has a first detection distance and a second detection distance and is configured to detect a 3D movement track of an operation body when a relative distance of the operation body relative to the electronic device is smaller than the first detection distance, wherein the first detection distance and the second detection distance are distances relative to the electronic device, the second detection distance is smaller than the first detection distance, and the 3D movement track is a continuous movement track having one end between the first and the second detection distances and the other end equal to or smaller than the second detection distance. The processing unit comprises a status detection module being configured to generate a status change signal when the operation body gets close to the second detection distance of the sensor unit or move away from the second detection distance; a track division module being configured to divide the 3D movement track according to the status change signal to obtain a first track when the relative distance is equal to or smaller than the second detection distance and a second track when the relative distance is greater than the second detection distance; and an execution module being configured to execute a corresponding control command according to the first track and the second track.

Through the solutions provided in the embodiments of the present disclosure, the 3D movement track can be detected in the process of the operation body getting close to or moving away from the electronic device and the 3D movement track in the process of the operation body getting close to or moving away from the electronic device can be combined with the operation performed on the sensor unit or performed at a position with a predetermined height away from the electronic device to execute the control command. A more accurate touch operation can be realized through effectively utilizing the movement information such as speed, acceleration, 3D movement track, angle of fall, angle of departure and so on of the operation body in the process of getting close to or moving away from the electronic device, so as to obtain a better interactive experience.

According to another aspect of the present disclosure, the present disclosure provides a method for moving a display object, a display device and an electronic device, which allows the user to operate with a simple gesture conforming to operating habits, so as to improve experience of the user.

According to one embodiment of the present disclosure, provided is a method for moving a display object applicable to an electronic device. The electronic device comprises a display unit. The relationship between the display object and an object display area for displaying the display object in a display area of the display unit is in a first relative position relationship. The method comprises: detecting a first operation of an operation body relative to the electronic device; obtaining a first distance between the operation body and the electronic device according to the first operation; determining whether the first distance is smaller than or equal to a first detection distance; obtaining a first operation parameter and a second operation parameter of the operation body according to the first operation when it is determined that the first distance is smaller than or equal to the first detection distance, wherein the first operation parameter differs from the second operation parameter; changing the relationship between the display object and the object display area from the first relative position relationship into a second relative position relationship based on the first operation parameter and the second operation parameter; detecting a second operation of the operation body relative to the electronic device; obtaining a second distance between the operation body and the electronic device according to the second operation; determining whether the second distance is greater than the second detection distance and smaller than or equal to a first detection distance; obtaining a third operation parameter differing from the first operation parameter according to the second operation when it is determined that the second distance is greater than the second detection distance and smaller than or equal to a first detection distance; and changing the relationship between the display object and the object display area from the second relative position relationship into a third relative position relationship based on the first operation parameter and the third operation parameter.

According to another embodiment of the present disclosure, provided is a display device, and its display area comprises an object display area. The object display area is used for displaying a display object, and the relationship between the display object and the object display area is in a first relative position relationship. The display device comprises: a first sensing unit for sensing a first operation of an operation body relative to the display device; a first obtaining unit for obtaining a first distance between the operation body and the display device according to the first operation; a first determining unit for determining whether the first distance is smaller than or equal to a first detection distance; a second obtaining unit for obtaining a first operation parameter and a second operation parameter of the operation body according to the first operation when it is determined that the first distance is smaller than or equal to the first detection distance, wherein the first operation parameter differs from the second operation parameter; a first changing unit for changing a relationship between the display object and the object display area from the first relative position relationship into a second relative position relationship based on the first operation parameter and the second operation parameter; a second sensing unit for sensing a second operation of the operation body relative to the display device; a third obtaining unit for obtaining a second distance between the operation body and the display device according to the second operation; a second determining unit for determining whether the second distance is greater than the first detection distance and smaller than or equal to a second detection distance; a fourth obtaining unit for obtaining a third operation parameter of the operation body differing from the first operation parameter according to the second operation when it is determined that the second distance is greater than the first detection distance and smaller than or equal to a second detection distance; and a second changing unit for changing the relationship between the display object and the object display area from the second relative position relationship into a third relative position relationship based on the first operation parameter and the third operation parameter.

According to another embodiment of the present disclosure, provided is an electronic device, comprising: a display, a display area of which comprises an object display area for displaying an display object, and the relationship between the display object and the object display area is in a first relative position relationship; a first sensor for sensing a first operation of an operation body relative to the electronic device; a second sensor for sensing a second operation of the operation body relative to the electronic device; and a processor; wherein the processor is configured to: obtain a first distance between the operation body and the electronic device according to the first operation; determine whether the first distance is smaller than a first detection distance; obtain a first operation parameter and a second operation parameter of the operation body according to the first operation when it is determined that the first distance is smaller than the first detection distance, wherein the first operation parameter differs from the second operation parameter; change a relationship between the display object and the object display area from the first relative position relationship into a second relative position relationship based on the first operation parameter and the second operation parameter; obtain a second distance between the operation body and the display device according to the second operation; determine whether the second distance is greater than the first detection distance and smaller than or equal to a second detection distance; obtain a third operation parameter of the operation body differing from the first operation parameter according to the second operation when it is determined that the second distance is greater than the first detection distance and smaller than a second detection distance; and change the relationship between the display object and the object display area from the second relative position relationship into a third relative position relationship based on the first operation parameter and the third operation parameter.

In the method, display device and electronic device according to the embodiment of the present disclosure, contact detection and proximity detection are combined, such that the user is able to conveniently control the display device or the electronic device with a simple gesture conforming to operating habits, so as to improve experience of the user.

BRIEF DESCRIPTION OF THE DRAWINGS

In order to more explicitly specify the technical solutions in the embodiments of the present disclosure or in the prior art, below will be a brief introduction of accompanying drawings needed to be used in descriptions of the embodiments or in the prior art. The drawings in the below descriptions are merely some illustrative embodiments of the present disclosure.

DETAILED DESCRIPTION

Preferred embodiments of the present disclosure will be described in detail by referring to the accompanying drawings. It should be noted that in the present specification and accompanying drawings, the same reference mark is given to the component parts that basically possess same steps and elements, and the repetitive description thereabout will be omitted.

In the below embodiments of the present disclosure, the electronic device refers to a device being capable of communicating with other devices. Specific forms of the electronic device include but not limited to a mobile phone, a personal computer, a digital camera, a personal digital assistant, a portable computer, a panel computer, a game machine, etc. The electronic device comprises a sensor unit. The sensor unit can comprise a proximity sensor. For example, the sensor unit can comprise one or more of proximity sensor elements such as an infrared sensor element, an ultrasonic sensor element, a capacitive sensor element and so on. The sensor element has a first detection distance and a second detection distance. The first detection distance and the second detection distance are distances relative to the electronic device, and the second detection distance is smaller than the first detection distance. For example, the first detection distance can be set as 10 mm while the second detection distance can be set as 0 mm. That is, the first detection distance is a height of 10 mm relative to the electronic device while the second detection distance is a plane of a touch sensing area in the electronic device. When fingers of the user touch the touch sensing area, the second detection height is reached.

Alternatively, the sensor unit can comprise a first sensor unit and a second sensor unit for sensing the movement track when an operation body contacts the electronic device and the movement track when the operation body does not contact the electronic device respectively. That is, the first sensor unit can comprise the touch sensing area constituted of various known sensor elements such as a capacitive touch sensor or a resistant touch sensor. The second sensor unit can detect the movement track between the first distance and the second distance. The second sensor unit can comprise a plurality of ultrasonic sensor elements, infrared sensor elements or image acquisition elements set at different positions of the electronic device to determine the position of the operation body.

Before the embodiment of the present disclosure is described, a principle of the proximity detection will be firstly described by referring to FIG. 4.

Figure 4A:
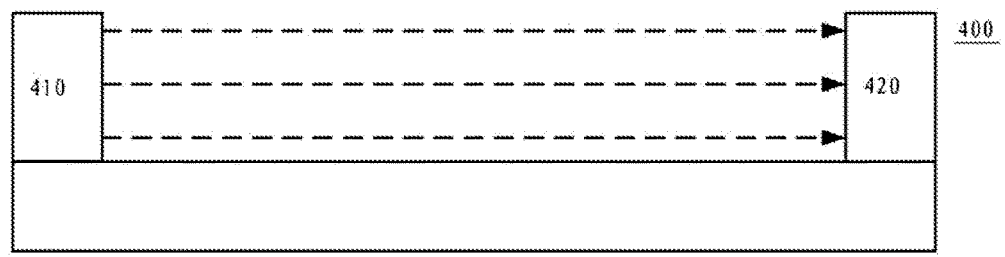
FIG. 4A shows an explanatory chart of a demonstration situation of detecting a movement track of an operation body between a first detection distance and a second detection distance through an infrared sensor element.

FIG. 4(A) shows an explanatory chart of a demonstration situation of detecting a movement track of an operation body between a first detection distance and a second detection distance through an infrared sensor element. As shown in FIG. 4(A), a first sensing module (not shown) of an electronic device 400 comprises an infrared transmitter 410 and an infrared receiver 420 respectively set on left and right sides (alternatively, up and down sides) of the electronic device. The infrared transmitter 410 transmits multiple groups of rays to the infrared receiver 420 at a predetermined interval along the left edge of the electronic device 400. Each group of rays comprises a plurality of infrared rays with different heights and in parallel to the surface of the electronic device, such that the movement track of the operation body can be determined according to rays sheltered by the operation body when the operation body enters into a detection range of the first sensing module.

On the other hand, a second sensing module can detect the movement track of the operation body at the second detection distance. The second sensing module can comprise touch sensor elements such as a voltage-sensitive, static touch panel or capacitive touch panel set on the electronic device. Preferably, the second sensing module can be set in an overlapping manner with the display area of the electronic device. In addition, a projection of the detection area of the first sensing module on the electronic device is the same with the detection area of the second sensing module on the electronic device.

Figure 4B:
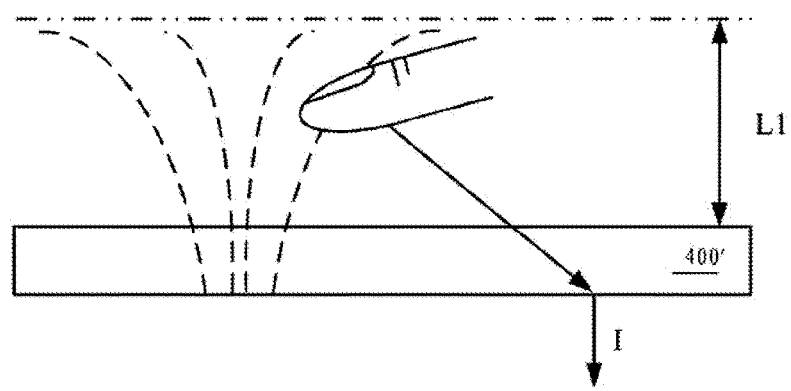
FIG. 4B illustrates a diagram of a proximity detection principle of a capacitive touch screen.

FIG. 4(B) shows an explanatory chart of a demonstration situation of detecting the operating object getting close to the electronic device through a capacitive touch screen 400'. Below will be a specification of the illustration of detecting the operating object getting close to the electronic device through a capacitive touch screen by referring to FIG. 4(B). As shown in FIG. 4(B), the range of electric field coupling (as shown in dashed line in FIG. 4(B)) of the capacitive touch screen 400' covers a space which has a height of L1 above the touch screen, thus forming an available detection area in the space which has a height of L1 above the touch screen. When the operation body enters the available detection area, a detectable coupling current I large enough can be produced. A controller in the capacitive touch screen 400' can calculate an accurate position of the fingers and a distance of the fingers away from the screen according to current values detected at each pole. Further, the controller can detect whether the fingers touch the surface of the screen.

Figure 1:
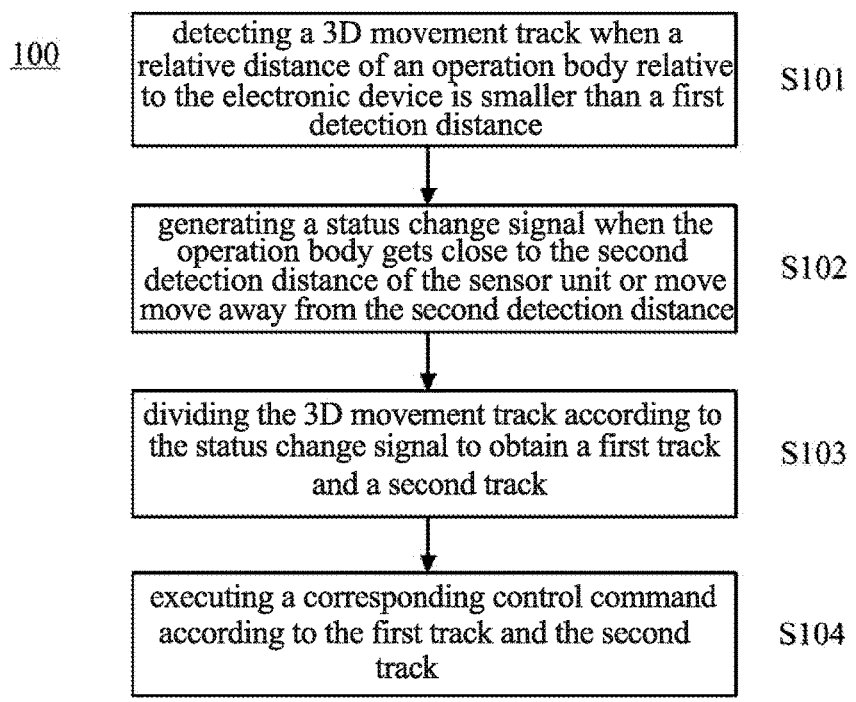
FIG. 1 describes a flow chart of a control method according to an embodiment of the present disclosure.

Below will be a description of a control method according to the embodiment of the present disclosure by referring to FIG. 1. FIG. 1 describes a flow chart of a control method 100 according to the embodiment of the present disclosure.

The contact control method 100 can be used for the electronic device comprising the sensor unit. As shown in FIG. 1, at step S101, the 3D movement track when the relative distance of the operation body relative to the electronic device is smaller than the first detection distance is detected. The 3D movement track of the operation body is a continuous movement track having one end between the first and the second detection distances and the other end equal to or smaller than the second detection distance.

In some cases, the operation body may reach from the first detection distance to the second detection distance, and comes back from the second detection distance to the first detection distance after moving a track at the second detection distance. At this time, a starting point and an ending point of the 3D movement track can be determined according to requirements of the current operation, that is, determining, according to the requirements of the current operation, whether the 3D movement track should be a track of the operation body reaching from the first detection distance to the second detection distance and moving at the second detection distance or a track of the operation body moving at the second detection distance and coming back from the second detection distance to the first detection distance. That is, at step S101, when the operation body reaches the first detection distance, it is started to detect the 3D movement track of the operation body until the operation body leaves from the second detection distance after it has reached the second detection distance, or when the operation body is at the second detection distance or at a position below the second detection distance, it is started to detect the 3D movement track of the operation body until the operation body comes back from the second detection distance to the first detection distance.

For example, in a case when an operation of page turning can be performed according to an input of the user during reading E-books through the electronic device, a position that the fingers of the user touch the touch sensing area of the electronic device can be taken as a reference point. When the projection of the position of the user's finger in the air on the touch sensing area before the user's finger touch the reference point is at the left side of the touch point (that is, when the user touches the reference point from the left side), it can correspond to a command of paging up; when the projection of the position of the user's finger in the air on the touch sensing area before the user's finger touch the reference point is at the right side of the touch point (that is, when the user touches the reference point from the right side), it can correspond to a command of paging down. In this case, the second detection distance can be set as zero, taking one end between the first and the second detection distances before the operation body reaches the second detection distance as a starting point of the 3D movement track, and taking the position of ending at the second detection distance or the position of leaving from the second detection distance after having moved a track at the second detection distance as an ending point of the 3D movement track.

On the other hand, in a case when an amplifying/reducing operation is performed according to an input of the user during viewing images through the electronic device, a position that the fingers of the user touch the touch sensing area of the electronic device can be taken as a reference point. When the projection of the position of the user's finger in the air on the touch sensing area after the user's finger leave from the reference point is above the reference point, it can correspond to a command of reducing the currently displayed image; when the projection of the position of the user's finger in the air on the touch sensing area after the user's finger leave from the reference point is below the reference point, it can correspond to a command of amplifying the currently displayed image. In this case, the second detection distance can be set as zero, taking the position of starting touch at the second detection distance as a starting point of the 3D movement track, and taking the position of reaching the first detection distance as an ending point of the 3D movement track.

In addition, for example, in a case when the user makes a hand writing input in the touch sensing area, the degree of thickness of strokes of the input characters when the fingers touch the touch sensing area can be a standard degree of thickness, and it can be set that the last stroke continues according to the projection position of the fingers in the display area when the fingers raise up; and the distance between the fingers and the electronic device is wider, the portion in the touch sensing area corresponding to the fingers is thinner, until the distance between the fingers and the electronic device exceeds the first detection distance. For example, when a Chinese character "之" is input, the fingers of the user gradually raise up and leave away from the touch sensing area when the last stroke is input, and then the last stroke gradually becomes thinner with the height of the fingers when the fingers of the user raise up and leave away from the touch sensing area. Alternatively, a reference time can further be set. When the fingers of the user raise up and leave away from the touch sensing area, the degree of thickness of the whole character previously input becomes thinner with the height of the fingers away from the electronic device. When the time that the fingers stay at the position below the first detection distance exceeds the set reference time, it is determined that the degree of thickness of the whole character is a degree of thickness corresponding to the height of the fingers at this time.

In this case, the second detection distance can be set as zero, taking the starting position of the operation body at the second detection distance as the starting point of the 3D movement track, and taking the ending position of the operation body between the first detection distance and the second detection distance as the ending point of the 3D movement track or in a case when the operation body keeps moving upward and the distance between the operation body and the electronic device exceeds the first detection distance, taking the position of the operation body at the first detection distance as the ending point of the 3D movement track.

The first detection distance can be preset by a device provider or the user. Alternatively, the first detection distance can also be set according to the operation of the user. In particular, the distance of a fixed position relative to the electronic device can be set as the first detection distance when it is detected that the time of the operation body staying at the fixed position exceeds a predetermined time.

Similar to the first detection distance, the second detection distance can be preset by a device provider or the user. Alternatively, the second detection distance can be set according to the operation of the user. In particular, the distance of a fixed position relative to the electronic device smaller than the first detection distance can be set as the second detection distance when it is detected that the time of the operation body staying at the fixed position exceeds a predetermined time. As described above, the second detection distance can be set as zero. That is, when the operation body is at the second detection distance, the electronic device can be contacted.

At step S102, when the operation body gets close to the second detection distance of the sensor unit or moves away from the second detection distance, a status change signal is generated. At step S103, the 3D movement track is divided according to the status change signal generated at step S102 to obtain a first track when the relative distance is equal to or smaller than the second detection distance and a second track when the relative distance is greater than the second detection distance. In the present embodiment, the second track can be a point at the position of the second detection distance relative to the electronic device, or a continuous movement track constituted of multiple points equal to or smaller than the second detection distance.

Last, at Step S104, a corresponding control command is executed according to the first track and the second track.

Preferably, a control command group can be determined according to the second track divided at step S103. Then, the corresponding control command is selected from the determined control command group according to the first track, and the selected control command is executed.

In particular, the second track when the user touches a volume control button on the touch screen can correspond to a volume adjustment command group. The volume adjustment command group can include increasing volume, decreasing volume, muting and maximizing volume. When the projection of the position of the user's finger in the air on the touch sensing area after the user's finger moves away from the position of the volume control button displayed on the touch screen is above the volume control button, the first track can correspond to maximizing volume; when the projection of the position of the user's finger in the air on the touch sensing area after the user's finger moves away from the position of the volume control button displayed on the touch screen is below the volume control button, the first track can correspond to muting; when the projection of the position of the user's finger in the air on the touch sensing area after the user's finger moves away from the position of the volume control button displayed on the touch screen is at the left side of the volume control button, the first track can correspond to decreasing volume; when the projection of the position of the user's finger in the air on the touch sensing area after the user's finger moves away from the position of the volume control button displayed on the touch screen is at the right side of the volume control button, the first track can correspond to increasing volume.

In the control method of the present embodiment. The control command is executed through detecting the 3D movement track in the process of the operation body getting close to or moving away from the electronic device and combining the 3D movement track in the process of the operation getting close to or moving away from the electronic device with the operation performed by the operation body on the sensor unit or performed at a position with a predetermined height away from the electronic device, thus enabling to achieve a more accurate touch and control operation, so as to bring better interactive experience.

FIGS. 2a-2d show explanatory charts of a demonstration situation of fingers getting close to or moving away from an electronic device. Below will be a description of the situation of the operation body getting close to or moving away from the electronic device according to the embodiment of the present disclosure by referring to FIGS. 2a-2d and taking fingers as an example. It is assumed that the second detection distance in the embodiment as shown in FIGS. 2a-2d is set as zero.

Figure 2A:
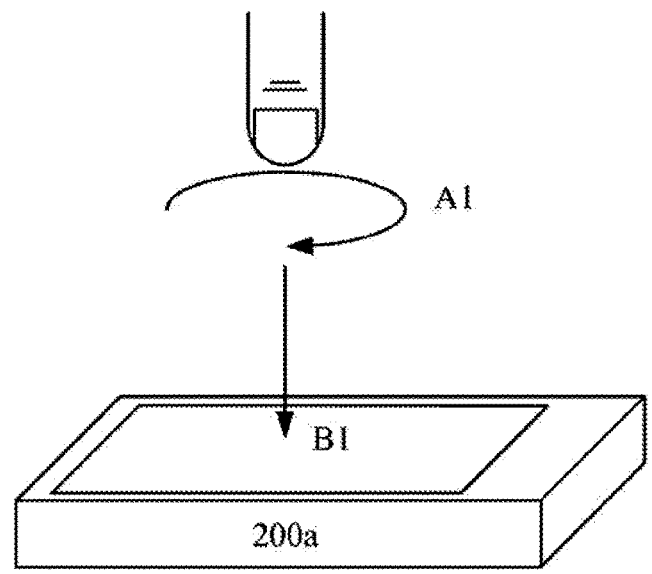
FIGS. 2A-2D show explanatory charts of a demonstration situation of fingers getting close to or moving away from an electronic device.
Figure 2B:
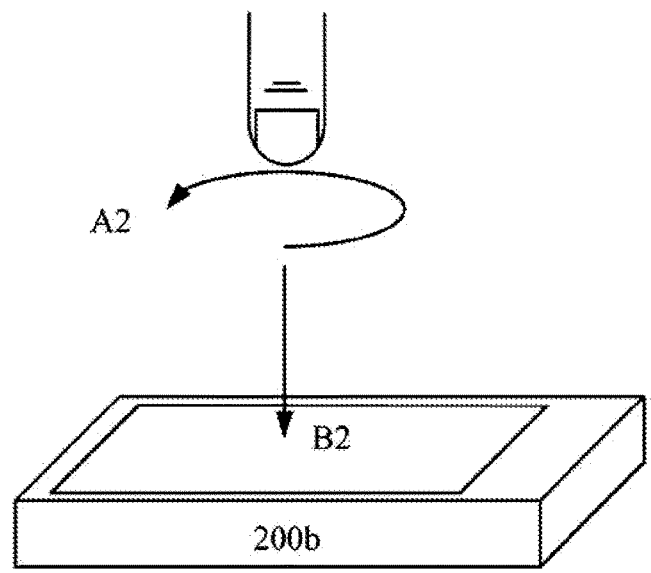

In the embodiments as shown in FIGS. 2a-2b, the 3D movement tracks have different first tracks and a same second track. As shown in FIG. 2a, the fingers firstly draw an arc in a clockwise direction at a height of a point A1 lower than the first detection distance, and then vertically decline and end moving after touching a point B1 of an electronic device 200a. According to the method as shown in FIG. 1, in the example as shown in FIG. 2a, the status change signal is generated when the fingers touch the point B1. According to the status change signal, the first track is a track of drawing an arc in a clockwise direction at the first detection distance and then vertically declining until reaching the point B1 (it can be determined whether the first track includes the critical point that the operation body reaches or moves away from the second detection distance according to different requirements for design). Since the fingers do not move on the electronic device 200a after reaching the electronic device 200*a*, the second track is the point B1. Supposing that an operation command group corresponding to touching one point on the electronic device 200*a* is to rotate the currently displayed image, it can be determined according to the first track as shown in FIG. 2*a* that the direction of rotating of the currently displayed image is in a clockwise direction.

On the other hand, in the example as shown in FIG. 2*b*, the fingers firstly draw an arc in a counter-clockwise direction at a height of a point A2 lower than the first detection distance, and then vertically decline and end moving after touching a point B2 of an electronic device 200*b*. According to the method as shown in FIG. 1, in the example shown in FIG. 2*b*, the status change signal is generated when the fingers touch the point B2. According to the status change signal, the first track is a track of drawing an arc in a clockwise direction at the first detection distance and then vertically declining until reaching the point B2 (it can be determined whether the first track includes the critical point that the operation body reaches or moves away from the second detection distance according to different requirements for design). Since the fingers do not move on the electronic device 200*b* after reaching the electronic device 200*b*, the second track is the point B2. Supposing that an operation command group corresponding to touching one point on the electronic device 200*b* is to rotate the currently displayed image, it can be determined according to the first track as shown in FIG. 2*b* that the direction of rotating of the currently displayed image is in a counter-clockwise direction.

Figure 2C:
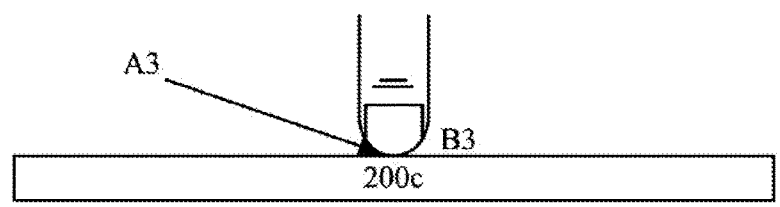

In addition, according to one embodiment of the present disclosure, the 3D movement track is a movement track of monotonously decreasing or increasing of a relative distance relative to an electronic device 200*c*. That is, the 3D movement track is a continuous movement track that the operation body gets close to and reaches the position equal to or smaller than the second detection height from the first detection height, or that the operation body moves away from the position equal to or smaller than the second detection distance and reaches the first detection height. FIG. 2*c* shows a continuous movement track of the fingers getting close to and reaching the second detection height from the first detection height. As shown in FIG. 2*c*, the finger moves from a point A3 in the air to a point B3 on the electronic device 200*c* along the direction shown by arrows. According to the method as shown in FIG. 1, in an example as shown in FIG. 2*c*, the status change signal is generated when the fingers touch the point B3. According to the status change signal, the first track is a vector between the point A3 and the point B3. Since the fingers do not move on the electronic device 200*c* after reaching the electronic device 200*c*, the second track is the point B3. Supposing that an operation command group corresponding to touching one point on the electronic device 200*c* is to move the currently displayed image, the direction of moving the currently displayed image can be determined according to the vector between the point A3 and the point B3.

Figure 2D:
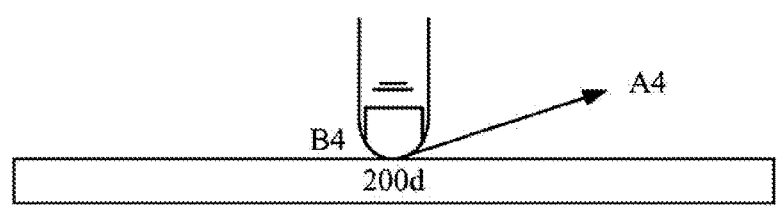

FIG. 2*d* shows a continuous movement track of the fingers moving away from the second detection distance and reaching the first detection height. As shown in FIG. 2*d*, the fingers move from a point B4 on the electronic device 200*d* to a point A4 in the air along the direction shown by arrows. According to the method as shown in FIG. 1, in an example as shown in FIG. 2*d*, the status change signal is generated when the fingers leave away from the point B4. According to the status change signal, the first track is a vector between the point A4 and the point B4. Since the fingers do not move on the electronic device 200*d*, the second track is the point B4. Supposing that an operation command group corresponding to touching one point on the electronic device 200*d* is to rotate the currently displayed image, the direction of rotating the currently displayed image can be determined according to the vector between the point A4 and the point B4.

Although the above embodiment is described by taking the second detection height being zero as an example, in an alternative embodiment of the present disclosure, the second detection height can be set as greater than zero, that is, a distance exists between the second detection height and the electronic device. The operation body does not have to touch the electronic device.

Figure 3:
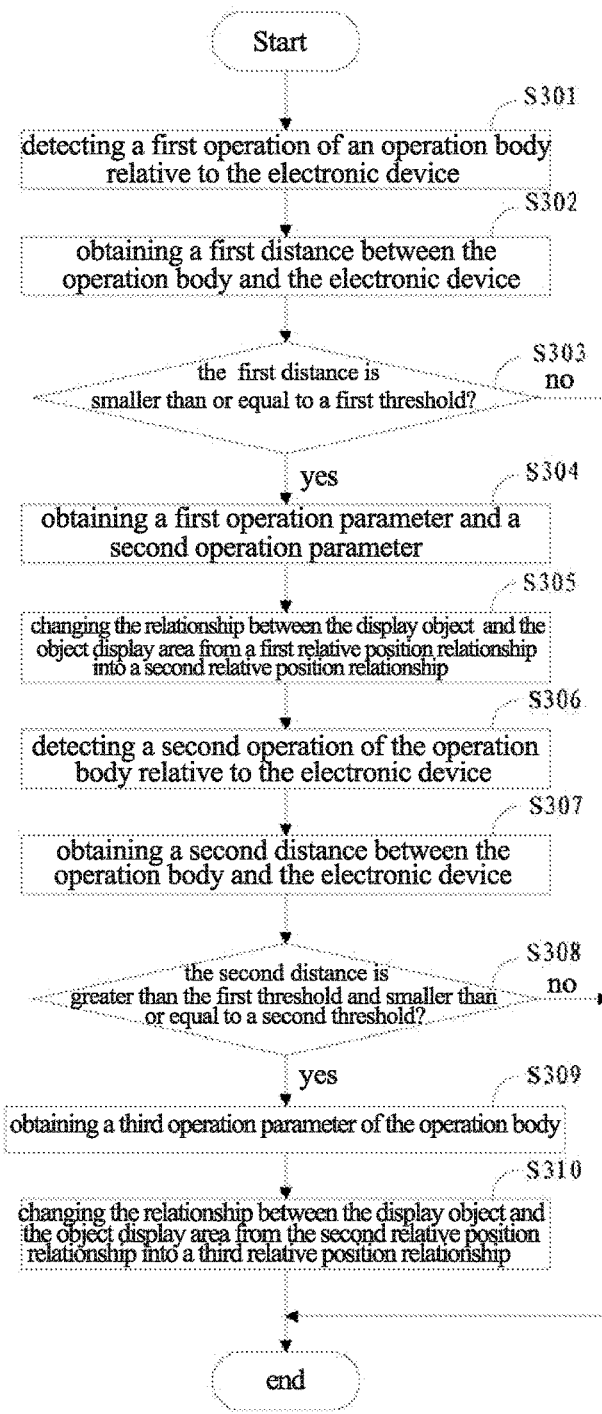
FIG. 3 illustrates a flow chart of steps of a method for moving a display object according to an embodiment of the present disclosure.

Below will be a description of an illustrative application of the control method for moving a display object according to the embodiment of the present disclosure by referring to FIG. 3. FIG. 3 shows a method 300 for moving a display object according to the embodiment of the present disclosure.

The method 300 is applicable to an electronic device. The electronic device is such as a potable mobile terminal, a personal computer and so on. The electronic device comprises a display unit, and a display area of the display unit comprises an object display area for displaying a display object. The display object for example includes a webpage, a picture, a list or other varieties of display controls (such as a sliding block). It needs to point out that the area of the object display area can be smaller than that of the display area, so as to display background information in other areas of the display area other than the object display area. Of course, the area of the object display area can also be equal to that of the display area. For example, in the illustrative diagrams as shown in FIGS. 5 and 6, the rectangular area S1 drawn in solid line is the display area of the electronic device, and the rectangular area S2 drawn in dashed line in the display area is the object display area in the display area, wherein a sliding block object (FIG. 5) and a list object (FIG. 6) are displayed respectively. It needs to point out that the list object in FIG. 7 comprises "contact 1", "contact 2" . . . "contact 10", amounting to ten items. However, since its area is larger than the area of the object display area, only the three items of "contact 4", "contact 5" and "contact 6" are displayed in the object display area.

In addition, the electronic device can comprise both a contact sensor and a proximity sensor. The touch sensor is used for sensing the contact of the operation body with the electronic device, and the proximity sensor is used for sensing the proximity of the operation body to the electronic device. Alternatively, the electronic device can merely comprise a proximity sensor. In this case, the proximity sensor is designed as either being used for sensing the proximity of the operation body to the electronic device or being used for sensing the contact of the operation body with the electronic device. Both the contact sensor and the proximity sensor below will be referred to as "sensor" in case of not needing to particularly distinguish the two. In addition, the display unit and the sensor unit composed of the sensor may be up-down overlappedly set, or may not be necessarily overlappedly set, only if there is a mapping relation between the display unit and the sensor unit.

When the method starts, the relationship between the display object and the object display area is in a first relative position relationship.

Figure 5A:
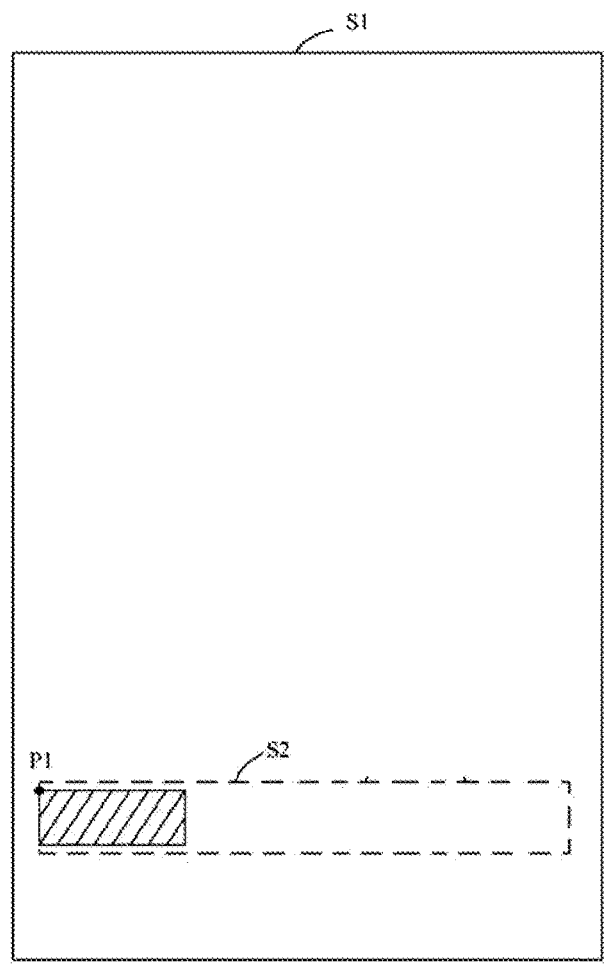
FIGS. 5A-5C illustrate schematic diagrams of display on an electronic device according to an embodiment of the present disclosure.

In particular, when the area of the display object is smaller than that of the object display area, the relationship between the display object and the object display area being in a first relative position relationship refers to: the display object is displayed at a first position of the object display area. For example, FIG. 5A shows a sliding block object via a shaded rectangular, and the position of the top left vertex of the sliding block object is set as the position of the display object. Then, in FIG. 5A, the display object is located at the first position (point P1) of the object display area. Of course, those skilled in the art can understand that besides the top left vertex, any other point in the display object can be set as the position of the display object.

On the other hand, when the area of the display object is larger than or equal to that of the object display area, the relationship between the display object and the object display area being in a first relative position relationship refers to: a first part of the display object is displayed in the object display area. For example, as described above, in FIG. 6A, the object display area merely shows the first part of the list object including ten items (three items of "contact 4", "contact 5" and "contact 6").

Below will be a description of a method for moving a display object according to the embodiment of the present disclosure by referring to FIG. 3.

As shown in FIG. 3, at step S301, the method detects a first operation of an operation body relative to the electronic device. In particular, the operation body is for example finger tip of fingers and pen point of a touch pen and so on for the user's operation. The method senses a first series of track points constituted of multiple track points formed on the electronic device by the operation body through the sensor comprised in the electronic device, so as to sense the first operation performed by the operation body on the electronic device. In other words, the operation body performs the first operation in a manner of sliding operation.

On the other hand, the sensor is able to sense the distance between the operation body and the electronic device, and thus at Step S302, the method obtains a first distance between the operation body and the electronic device according to the sensing result of the sensor.

At Step S303, the method determines whether the first distance is smaller than or equal to the first detection distance. The first detection distance is a threshold set for the method recognizing the first operation as a contact operation, and its value is appropriately set by those skilled in the art as required. For example, when the sensor and the display are overlappedly arranged from up to down, the first detection distance can be set as a thickness of a thin film for packaging the sensor. When a protector (such as a piece of glass being used for the operation body to contact), the sensor and the display are overlappedly arranged from up to down, the first detection distance can be set as the thickness of the protector.

When it is determined that the first distance is greater than the first detection distance, the method ends. On the other hand, when it is determined that the first distance is smaller than or equal to the first detection distance, the method moves forward to step S304.

At step S304, the method obtains a first operation parameter and a second operation parameter of the operation body according to the first operation. In particular, as described above, the method is able to obtain the first series of track points of the first operation through the sensor. The method can obtain the first operation parameter and the second operation parameter of the operation body through the first series of track points.

More particularly, the method can obtain the movement direction of the first operation through the position of the first track point and the last track point in the first series of track points as the first operation parameter. Of course, in a case of the electronic device being in support of a relatively high operational capability, in order to improve accuracy, the method also can obtain the real-time movement direction of the first operation through any two of track points (adjacent) in the first series of track points as the first operation parameter.

In addition, the method also can obtain a second operation parameter being different from the first operation parameter. For example, the method can obtain a movement distance of the first operation through the positions of the first track point and the last track point in the first series of track points as the second operation parameter. Alternatively, the method can obtain an operation time of the first operation through timing of a system clock in the electronic device as the second operation parameter. Alternatively, the method can obtain a speed of the first operation through the positions of the first track point and the last track point in the first series of track points as well as the timing of the system clock as the second operation parameter. Of course, similarly, the method can obtain a real-time speed of the first operation through any two of track points (adjacent) in the first series of track points as well as the timing of the system clock in the electronic device as the second operation parameter.

At step S305, the method changes the relationship between the display object and the object display area from the first relative position relationship into a second relative position relationship based on the first operation parameter and the second operation parameter.

In particular, the method firstly converts the first operation parameter and the second operation parameter into a first movement parameter and a second movement parameter of the display object respectively.

More particularly, for example, the method converts the movement direction of the first operation into the movement direction of the display object as the first movement parameter. For example, the method can set the direction the same with or opposite to the movement direction of the first operation as the movement direction of the display object. In the below description, it is assumed that the movement direction of the display object is the same with that of the first operation.

For another example, the method converts the movement distance of the first operation into a first movement distance of the display object as the second movement parameter. For example, the method can add the movement distance of the first operation with one coefficient to obtain the first movement distance of the display object. The coefficient is appropriately set by those skilled in the art according to the needs. For example, the coefficient can be set as zero. Of course, the conversion mode described above is just for illustration. Those skilled in the art can understand that the method can obtain the first movement distance of the display object through converting the movement distance of the first operation by other modes (for example multiplying by one coefficient or through a piecewise function and so on) as the second movement parameter.

Alternatively, the method converts the operation time of the first operation into the first movement time of the display object as the second movement parameter. In order to conform to the user's operation habit, preferably, the method sets the operation time of the first operation as the first movement time of the display object. Of course, those skilled in the art can also obtain the first movement time of the display object through an appropriate arithmetic transformation of the operation time of the first operation, details omitted.

Alternatively, the method converts the speed of the first operation into the first movement speed of the display object as the second movement parameter. For example, the method can preset a piecewise function. When the speed of the first operation falls into [$v_0$, $v_1$), the method sets the first movement speed of the display object as $V_1$; when the speed of the first operation falls into [$v_1$, $v_2$), the method sets the first movement speed of the display object as $V_2$; . . . . When the speed of the first operation falls into [$v_{n-1}$, $v_n$), the method sets the first movement speed of the display object as $V_n$. Values of the $v_1$, $v_2$ . . . $v_{n-1}$, $v_n$ and $V_1$, $V_2$ . . . $V_n$ can be appropriately set by those skilled in the art according to the needs. Of course, similar to the above, those skilled in the art can understand that the method can obtain the first movement speed of the display object through converting the speed of the first operation by other modes (for example multiplying by one coefficient or through a piecewise function and so on) as the second movement parameter.

After that, the method moves the display object based on the first movement parameter and the second movement parameter, such that the relationship between the display object and the object display area is changed from the first relative position relationship into the second relative position relationship.

Figure 5B:
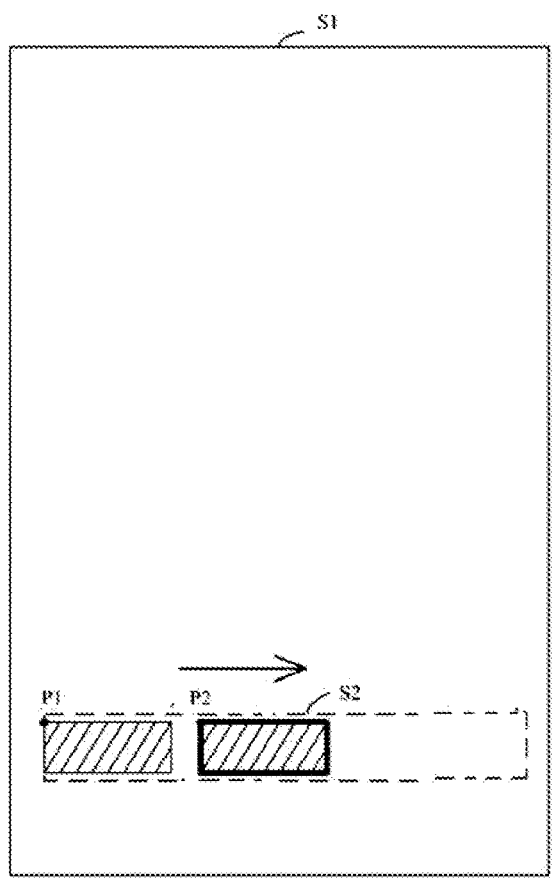

More particularly, for example, the method can compare the area of the display object and the area the object display area. When the area of the display object is smaller relative to the area of the object display area, the method moves the display object from the first position to the second position of the object display area based on the movement direction of the display object and further based on at least one of the first movement distance, the first movement time and the first movement speed of the display object, wherein the second position differs from the first position. For example, as shown in FIG. 5B, the method moves the display object from the first position (P1) as shown in FIG. 5A to the position (P2) shown by the heavy solid line based on the obtained first movement parameter (towards the right) and the second movement parameter.

Figure 6A:
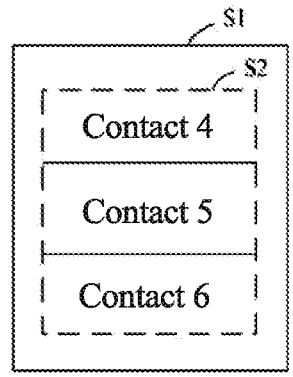
FIGS. 6A-6C illustrate schematic diagrams of display on an electronic device according to an embodiment of the present disclosure.
Figure 6B:
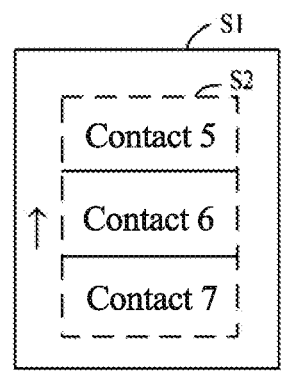

On the other hand, when the area of the display object is larger than or equal to the area of the object display area, the method moves the display object based on the movement direction of the display object and further based on at least one of the first movement distance, the first movement time and the first movement speed of the display object, so as to display a second part of the display object on the object display area. It needs to point out that the second part and the first part are at most partially overlapped. In other words, in a case of a greater first movement distance, a longer first movement time or a faster first movement speed, the second part and the first part can be non-overlapped. On the contrary, in a case of a smaller first movement distance, a shorter first movement time or a slower first movement speed, the second part and the first part are partially overlapped. For example, as shown in FIG. 6B, the method moves the display object based on the obtained first movement parameter (upward) and the second movement parameter, so as to display the second part of the display object (three items of "contact 5", "contact 6" and "contact 7") on the object display area, wherein the two items of "contact 5" and "contact 6" are comprised in both the first part of the display object as shown in FIG. 6A and the second part of the display object as shown in FIG. 6B, that is, the first part and the second part are partially overlapped.

After that, at step S306, the method senses the second operation of the operation body relative to the electronic device. In particular, the method senses a second series of track points formed from the projection of the operation body on the electronic device through the sensor (in particular, the proximity sensor), so as to sense the second operation performed by the operation body on the electronic device. In other words, in the operation at step S306, the operation body does not contact with the electronic device but merely gets close to the electronic device.

The proximity sensor can sense the distance between the operation body and the electronic device, thereby at step S307, the method obtains the second distance between the operation body and the electronic device according to the sensing result of the proximity sensor.

In addition, preferably, in the processing at step S307, the method obtains the second distance between the operation body and the electronic device at a predetermined timing. The predetermined timing is appropriately determined by those skilled in the art according to the needs. For example, the predetermined timing can be set as 3 ms, 5 ms and so on. Thus, the method obtains in real time the real-time distance between the operation body and the electronic device in the second operation.

At step S308, the method determines whether the second distance is greater than the first detection distance and smaller than or equal to the second detection distance. The second detection distance is a threshold set for the method recognizing the second operation as a proximity operation, details omitted.

When it is determined that the second distance is greater than the second detection distance, the method ends. Similarly, when it is determined that the second distance is smaller than or equal to the first detection distance, the method ends. Of course, in this case, the method can continue performing a corresponding processing with respect to the second operation as a contact operation according to the prior art, details omitted. In addition, in a case when the second distance is continuously obtained at a predetermined timing and at a moment when it is determined that the second distance is smaller than or equal to the first detection distance or greater than the second detection distance, the method can keep the relative position relationship between the display object and the object display area at this moment unchanged.

On the other hand, when it is determined that the second distance is smaller than or equal to the second detection distance, the method moves forward to step S309.

At Step S309, the method obtains a third operation parameter of the operation body being different from the first operation parameter according to the second operation.

In particular, as described above, the method is able to obtain the second series of track points formed from the projection of the second operation on the electronic device through the proximity sensor. The method can obtain the third operation parameter of the operation body through the second series of track points.

More particularly, for example, the method can obtain the movement distance of the second operation through the positions of the first track point and the last track point in the second series of track points as the third operation parameter. Alternatively, the method can obtain an operation time of the second operation through the timing of the system clock in the electronic device as the third operation parameter. Of course, the method can further obtain a speed of the second operation through the movement distance of the second operation and the operation time of the second operation obtained above as the third operation parameter.

After that, at step S310, the method changes the relationship between the display object and the object display area from the second relative position relationship into a third relative position relationship based on the first operation parameter and the third operation parameter.

In particular, the method firstly converts the third operation parameter into a third movement parameter of the display object.

More particularly, for example, the method converts the movement direction of the second operation into the second movement direction of the display object as the third movement parameter. For example, the method can add the movement distance of the second operation with one coefficient to obtain the movement distance of the display object. The coefficient is appropriately set by those skilled in the art according to the needs. For example, the coefficient can be set as greater than zero. Thus, the user can move the display object a relatively long distance through the operation of moving a relatively short distance. Of course, the conversion mode described above is just for illustration. Those skilled in the art can understand that the method can obtain the second movement distance of the display object through converting the movement distance of the second operation by other modes (for example multiplying by one coefficient or through a piecewise function and so on) as the third movement parameter.

Alternatively, the method converts the operation time of the second operation into the second movement time of the display object as the third movement parameter. In order to conform to the user's operation habit, preferably, the method sets the operation time of the second operation as the second movement time of the display object. Of course, those skilled in the art can also obtain the second movement time of the display object through an appropriate arithmetic transformation on the operation time of the second operation, details omitted.

Alternatively, the method converts the speed of the second operation into the second movement speed of the display object as the third movement parameter. Similar to the above, those skilled in the art can understand that the method can obtain the second movement speed of the display object through converting the speed of the second operation by a variety of modes (for example multiplying by one coefficient or through a piecewise function and so on) as the third movement parameter.

After that, the method moves the display object based on the first movement parameter and the third movement parameter, such that the relationship between the display object and the object display area is changed from the second relative position relationship into the third relative position relationship.

Figure 5C:
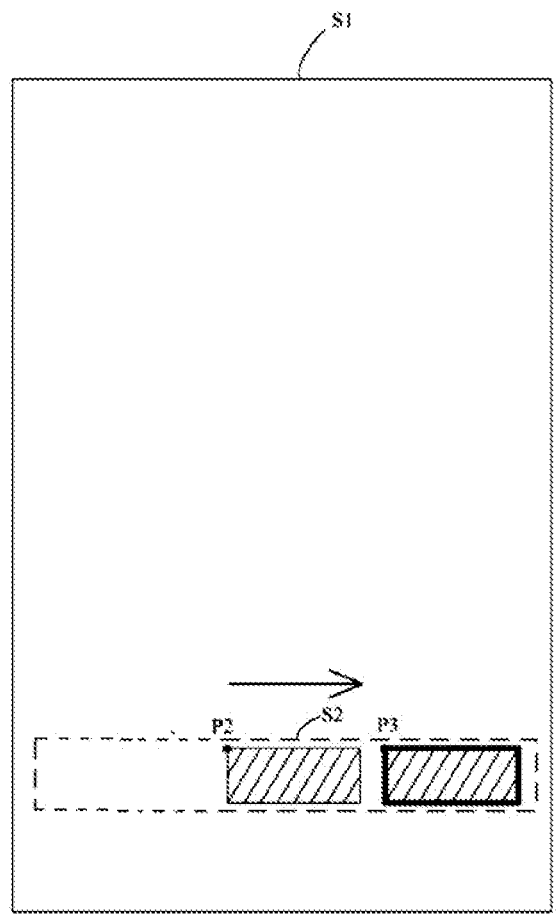

More particularly, for example, the method can make a reference to the relationship between the area of the display object and the area the object display area obtained at step S305. When the area of the display object is smaller relative to the area of the object display area, the method moves the display object from the second position to the third position of the object display area based on the movement direction of the display object and further based on at least one of the second movement distance, the second movement time and the second movement speed of the display object, wherein the third position differs from the second position. For example, as shown in FIG. 5C, the method moves the display object from the second position (P2) as shown in FIG. 5B to the position (P3) shown by the heavy solid line based on the obtained first movement parameter (towards the right) and the third movement parameter.

Figure 6C:
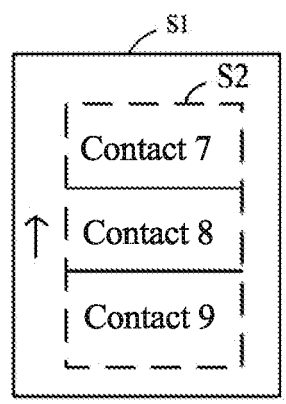

On the other hand, when the area of the display object is larger than or equal to the area of the object display area, the method moves the display object based on the movement direction of the display object and further based on at least one of the second movement distance, the second movement time and the second movement speed of the display object, so as to display a third part of the display object on the object display area. It needs to point out that the third part and the second part are at most partially overlapped. In other words, in a case of a greater movement distance, a longer movement time or a faster movement speed, the third part and the second part can be non-overlapped. On the contrary, in a case of a smaller movement distance, a shorter movement time or a slower movement speed, the third part and the second part are partially overlapped. For example, as shown in FIG. 6C, the method moves the display object based on the obtained first movement parameter (upward) and the third movement parameter, so as to display the third part of the display object (three items of "contact 7", "contact 8" and "contact 9") on the object display area, wherein the item "contact 7" is comprised in both the second part of the display object as shown in FIG. 6B and the third part of the display object as shown in FIG. 6C, that is, the second part and the third part are partially overlapped.

In the embodiment described above, the second series of track points of the second operation sensed by the method through the proximity sensor comprises a plurality of track points. In other words, the operation body performs the second operation in a manner of sliding above the electronic device. Alternatively, the second series of track points sensed by the method can merely comprise a single track point. In other words, the operation can hang in the air and stay above the electronic device. In this case, likewise, the method moves the display object at a unit movement speed predetermined by the method based on the obtained movement direction of the display object and second movement time of the display object as described above, such that the relationship between the display object and the object display area changes from the second relative position relationship into the third relative position relationship.

Preferably, in this case, the method further can obtain the second distance and control the second movement speed of the display object based on the second distance. For example, the method can preset a piecewise function. When the second distance falls into $(d_0, d_1]$, the method sets the second movement speed of the display object as $V'_1$; when the second distance falls into $[d_1, d_2]$, the method sets the second movement speed of the display object as $V'_2$; . . . when the second distance falls into $(d_{n-1}, d_n]$ the method sets the second movement speed of the display object as $V'_n$. Values of the $d_1, d_2 \ldots d_{n-1}, d_n$ and $V'_1, V'_2 \ldots V'_n$ can be appropriately set by those skilled in the art according to the needs. It needs to be noted that in the above method, $d_0$ corresponds to the first detection distance, and $d_n$ corresponds to the second detection distance. Of course, similar to the above, those skilled in the art can understand that the method can obtain the second movement speed of the display object through converting the second distance by other modes (for example multiplying by one coefficient and so on). Thus, the user can control the movement speed of the display object through adjusting the distance between the operation body and the electronic device, and can intuitively recognize the relationship between the distance and the movement speed of the display object while adjusting, so as to be able to accurately and quickly display the desired content on the object display area.

Figure 5D:
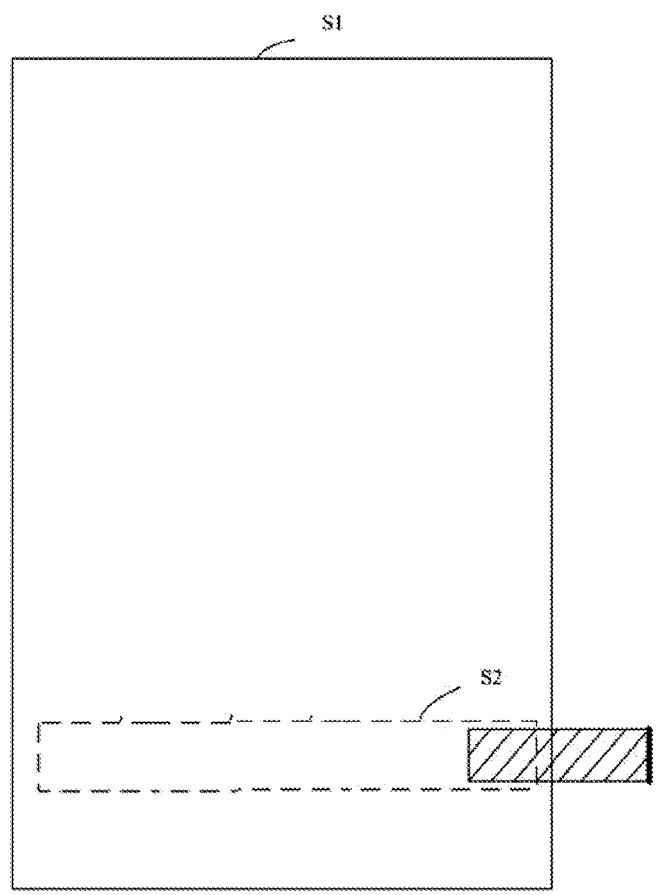
FIGS. 5D and 5E respectively illustrate diagrams of a boundary-exceeding status and a boundary status according to an embodiment of the present disclosure.
Figure 5E:
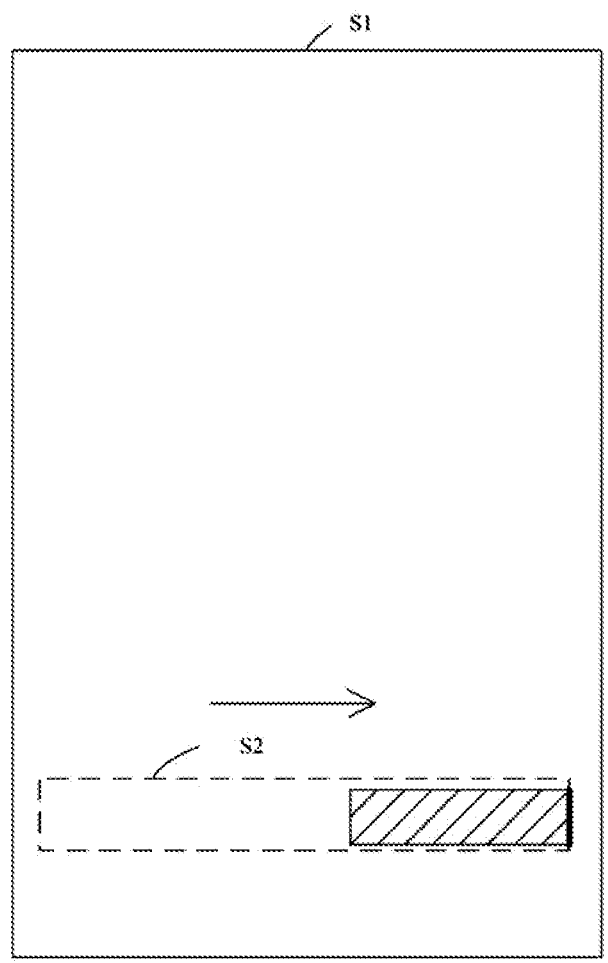

In addition, in the operation at step S310, after the movement distance and the movement direction of the display object are determined as described above, preferably, the method can determine whether the moved display objet will be in a boundary-exceeding status based on the movement distance. When it is determined that the moved display object will be in a boundary-exceeding status, the display object is moved until the display object is in a boundary status, which is taken as a third relative position relationship between the display object and the object display area.

Wherein when the area of the display objet is smaller than the area of the object display area, the boundary-exceeding status is: a first object boundary corresponding to the movement direction in the display object exceeds the object display area; the boundary status is: the first object boundary coincides with a first display boundary corresponding to the movement direction in the object display area. For example, as schematically illustrated in FIG. 5D, in a case when the movement direction is towards the right, the boundary-exceeding status is that the right boundary of the sliding object (as shown with thick solid lines in the figure) exceeds the right boundary of the object display area S2. In the case, the method moves the display object until reaching the boundary status as shown in FIG. 5E. At this moment, the right boundary of the sliding object coincides with the right boundary of the object display area S2.

Figure 6D:
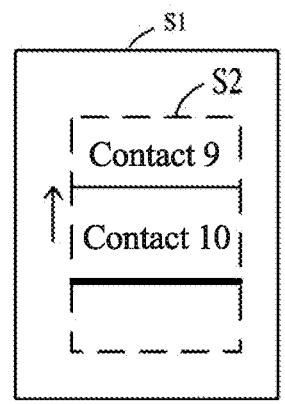
FIGS. 6D and 6E respectively illustrate diagrams of a boundary-exceeding status and a boundary status according to an embodiment of the present disclosure.
Figure 6E:
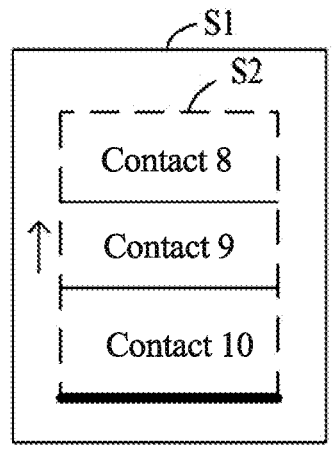

When the area of the display objet is greater than or equal to the area of the object display area, the boundary-exceeding status is: a second object boundary reversely corresponding to the movement direction in the display object is located in the object display area; the boundary status is: the second object boundary coincides with a second display boundary reversely corresponding to the movement direction in the object display area. For example, as schematically illustrated in FIG. 6D, in a case when the movement direction is upwards, the boundary-exceeding status is that the lower boundary of the list object (as shown with thick solid lines in the figure) is located in the object display area. In the case, the method moves the display object until reaching the boundary status as shown in FIG. 6E. At this moment, the lower boundary of the list object coincides with the lower boundary of the object display area S2.

The above describes the method according to the embodiment of the present disclosure. In the method according to the embodiment of the present disclosure, the contact sensing is performed during the first operation, the proximity sensing is performed during the second operation, and a corresponding process is performed according to the result of the contact sensing and the proximity sensing, such that the user is able to operate with a simple gesture conforming to operating habits (in particular, the gesture of firstly contacting and sliding, and then hanging in the air and staying, or the gesture of firstly contacting and sliding, and then hanging in the air and sliding) to expediently control the electronic device to perform the corresponding operation, so as to improve experience of the user.

For example, as described above, in the unlocking operation of some electronic devices, the user needs to move a display object (such as a sliding block) from one position to another position on the touch display screen. In the method according to the embodiment of the present disclosure, through an appropriate setting in the operation at step S310, for example, the movement distance of the operation body as the third operation parameter in the second operation is multiplied by a coefficient greater than 1, thus being converted to obtain the second movement distance of the display object, such that the user is able to move the display object a relatively long distance through a relatively short distance of hanging in the air and sliding, thus shortening on the whole the movement distance that the user needs to operate the operation body and reducing the user's operation time, so as to conform to the user's operating habits to the better and improve experience of the user.

For another example, in the common scrolling operation of the display object in the electronic device, through the method according to the embodiment of the present disclosure (in particular, the operations at steps S306-S310), in order to view the content currently not displayed on the touch display screen, the user performs a relatively short distance of contact sliding operation to make the display object to start scrolling in a direction, after that, it only needs to perform the operation of hanging in the air and staying, the display object can continue scrolling in the direction until the desired content is displayed in the object display area, so that the user is able to move the display object a relatively long distance through a relatively short distance of contact sliding operation and the subsequent convenient operation of hanging in the air and staying. In addition, preferably, the user can further control the movement speed of the display object through adjusting the distance between the operation body and the electronic device, and intuitively recognize the relationship between the distance and the movement speed of the display object while adjusting, so as to be able to accurately and quickly display the desired content on the object display area, thus improving experience of the user.

Figure 7:
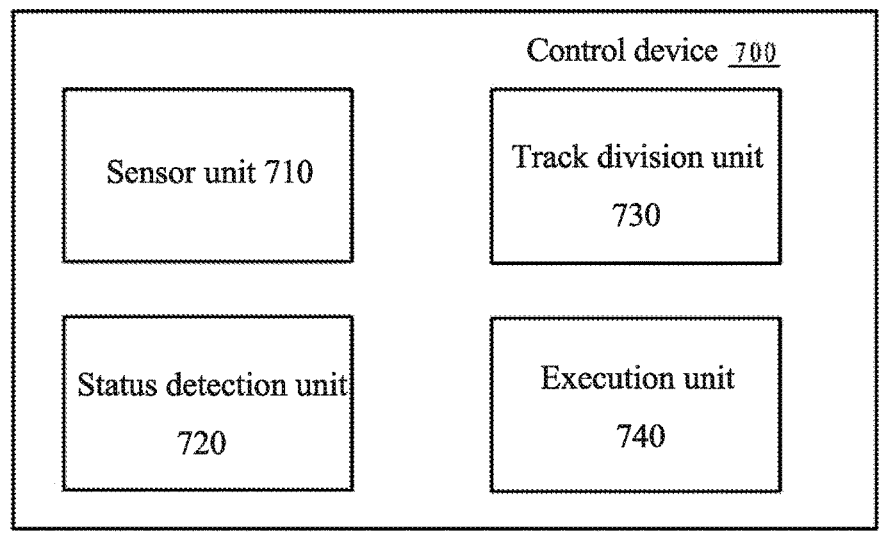
FIG. 7 shows a demonstrative structure block diagram of a control device according to an embodiment of the present disclosure.

Below will be a specification of a control device according to the embodiment of the present disclosure by referring to FIG. 7. FIG. 7 shows a demonstrative structure block diagram of a control device 700 according to an embodiment of the present disclosure. The control device 700 can be applicable to an electronic device. As shown in FIG. 7, the control device 700 of the present embodiment comprises a sensor unit 710, a status detection unit 720, a track division unit 730 and an execution unit 740. Respective units of the electronic device 700 execute respective steps/functions of the control method in FIG. 1. Therefore, for simplicity of description, specific details are omitted.

For example, the sensor unit 710 has a first detection distance and a second detection distance. The sensor unit 710 can detect a 3D movement track when a relative distance of operation body relative to the electronic device is smaller than the first detection distance, wherein the first detection distance and the second detection distance are distances relative to the electronic device and the second detection distance is smaller than the first detection distance. The 3D movement track is a continuous movement track having one end between the first and the second detection distances and the other end equal to or smaller than the second detection distance.

As described above, in some cases, the operation body may reach from the first detection distance to the second detection distance, and comes back from the second detection distance to the first detection distance after moving a track at the second detection distance. At this time, a starting point and an ending point of the 3D movement track can be determined according to requirements of the current operation, that is, determining, according to the requirements of the current operation, whether the 3D movement track should be a track of the operation body reaching from the first detection distance to the second detection distance and moving at the second detection distance or a track of the operation body moving at the second detection distance and coming back from the second detection distance to the first detection distance. That is, when the operation body reaches the first detection distance, the sensor unit 710 starts to detect the 3D movement track of the operation body until the operation body leaves from the second detection distance after it has reached the second detection distance, or when the operation body is at the second detection distance or at a position below the second detection distance, the sensor unit 10 starts to detect the 3D movement track of the operation body until the operation body comes back from the second detection distance to the first detection distance.

The first detection distance of the sensor unit 710 can be preset by a device provider or the user. Alternatively, the sensor unit 710 can set the first detection distance according to the operation of the user. In particular, the sensor unit 310 can set the distance of a fixed position relative to the electronic device as the first detection distance when it is detected that the time of the operation body staying at the fixed position exceeds a predetermined time.

Similar to the first detection distance, the second detection distance of the sensor unit 710 can be preset by a device provider or the user. Alternatively, the sensor unit 710 can further set the second detection distance according to the operation of the user. In particular, the sensor unit 710 sets the distance of a fixed position relative to the electronic device smaller than the first detection distance as the second detection distance when it is detected that the time of the operation body staying at the fixed position exceeds a predetermined time. As described above, the second detection distance of the sensor unit 710 can be set as zero. That is, when the operation body is at the second detection distance, the electronic device can be contacted.

According to one embodiment of the present disclosure, the 3D movement track is a movement track of monotonously decreasing or increasing of a relative distance relative to the electronic device. That is, the 3D movement track is a continuous movement track that the operation body gets close to and reaches the position equal to or smaller than the second detection distance from the first detection height, or that the operation body moves away from the position equal to or smaller than the second detection distance and reaches the first detection height.

The status detection unit 720 can generate a status change signal when the operation body gets close to the second detection distance of the sensor unit or moves away from the second detection distance. The track division unit 730 can divide a 3D movement track according to the status change signal generated by the status detection unit 720 to obtain a first track when the relative distance is equal to or smaller than the second detection distance and a second track when the relative distance is greater than the second detection distance. In the present embodiment, the second track can be a point at the second detection distance relative to the electronic device, or a continuous movement track constituted of multiple points at the second detection distance or lower than the second detection distance. The execution unit 740 can execute a corresponding control command according to the first track and the second track.

In the control device of the present embodiment, the control command can be executed through detecting the 3D movement track in the process of the operation body getting close to or moving away from the electronic device and combining the 3D movement track in the process of the operation body getting close to or moving away from the electronic device with the operation performed by the operation body on the sensor unit or performed at a position with a predetermined height away from the electronic device, such that a more accurate touch operation can be realized, so as to obtain a better interactive experience.

Figure 8:
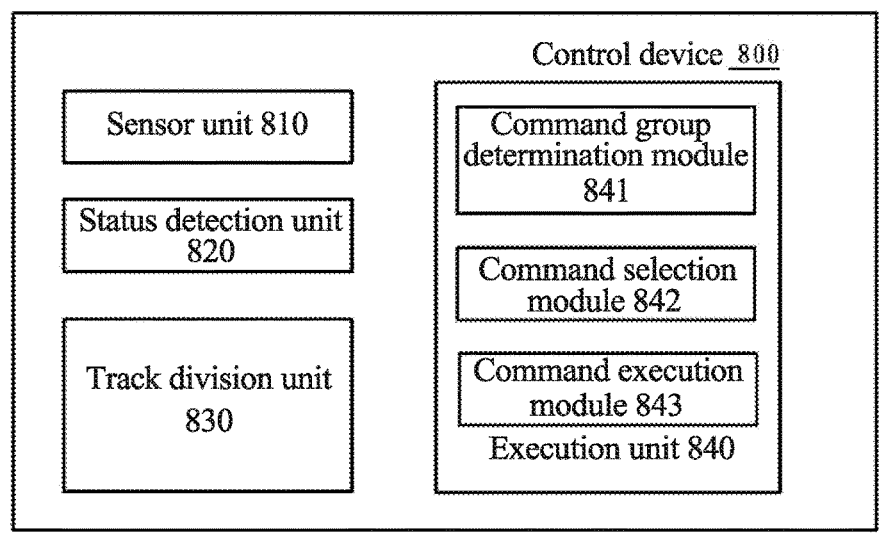
FIG. 8 shows a demonstrative structure block diagram of a control device according to another embodiment of the present disclosure.

Below will be a specification of a control device according to another embodiment of the present disclosure by referring to FIG. 8. FIG. 8 shows a demonstrative structure block diagram of a control device 800 according to another embodiment of the present disclosure. The control device 800 can be applicable to an electronic device. As shown in FIG. 8, similar to the control device 700, the control device 800 of the present embodiment comprises a sensor unit 810, a status detection unit 820 and a track division unit 830. The sensor unit 810 has a first detection distance and a second detection distance. The sensor unit 810 can detect a 3D movement track when a relative distance of the operation body relative to the electronic device is smaller than the first detection distance, wherein the first detection distance and the second detection distance are distances relative to the electronic device and the second detection distance is smaller than the first detection distance. The 3D movement track is a continuous movement track having one end between the first and the second detection distances and the other end equal to or smaller than the second detection distance.

The status detection unit 820 can generate a status change signal when the operation body gets close to the second detection distance of the sensor unit or moves away from the second detection distance. The track division unit 830 can divide a 3D movement track according to the status change signal generated by the status detection unit 820 to obtain a first track when the relative distance is equal to or smaller than the second detection distance and a second track when the relative distance is greater than the second detection distance.

The control device 800 further comprises an execution unit 840. As shown in FIG. 8, the execution unit 840 can comprise a command group determination module 841, a command selection module 842 and a command execution module 843. In particular, the command group determination module 841 can determine a control command group according to the second track, the command selection module 842 can select a corresponding control command from the control command group determined by the command group determination module according to the first track, and the command execution module 843 can execute the control command selected by the command selection module.

In particular, when the control device 800 is used to play music, the command group determination module 841 can determine that the second track can correspond to a volume adjustment command group according to the user touching a volume control button on the touch screen. The volume adjustment command group can include increasing volume, decreasing volume, muting and maximizing volume. When the projection of the user's finger in the air on the touch sensing area after the user's finger moves away from the position of the volume control button displayed on the touch screen is above the volume control button, the command selection module 842 can determine that the first track can correspond to maximizing volume; when the projection of the user's finger in the air on the touch sensing area after the user's finger moves away from the position of the volume control button displayed on the touch screen is below the volume control button, the command selection module 842 can determine that the first track can correspond to muting; when the projection of the user's finger in the air on the touch sensing area after the user's finger moves away from the position of the volume control button displayed on the touch screen is at the left side of the volume control button, the command selection module 842 can determine that the first track can correspond to decreasing volume; when the projection of the user's finger in the air on the touch sensing area after the user's finger moves away from the position of the volume control button displayed on the touch screen is at the right side of the volume control button, the command selection module 842 can determine that the first track can correspond to increasing volume. The command execution module 843 can execute the volume adjustment command selected by the command selection module 822.

In the embodiment according to the present disclosure, the sensor unit can comprise one or more of an infrared sensor element, an ultrasonic sensor element and a capacitive sensor element. For example, the 3D movement track can be detected through the capacitive sensor element when the relative distance of the operation body relative to the electronic device is smaller than the first detection distance. In particular, a first response capacitance corresponding to the first detection distance and a second response capacitance corresponding to the second detection distance can be determined according to the method in the above embodiment. The sensor unit can perform a corresponding operation according to the response capacitance generated from the operation body.

Alternatively, when the second detection distance is set as zero, the 3D movement track is a continuous movement track having one end between the first and the second detection distances and the other end equal to the second detection distance. The sensor unit can comprise a first sensing module and a second sensor module to detect the movement track of the operation body between the first and the second detection distances and the movement track at the second detection distance respectively. That is, the first sensor module can detect the movement track of the operation body between the first and the second detection distances. The first sensor module can comprise a plurality of ultrasonic sensor elements, infrared sensor elements or imaging devices set at different positions of the electronic device to determine the position of the operation body.

Figure 9:
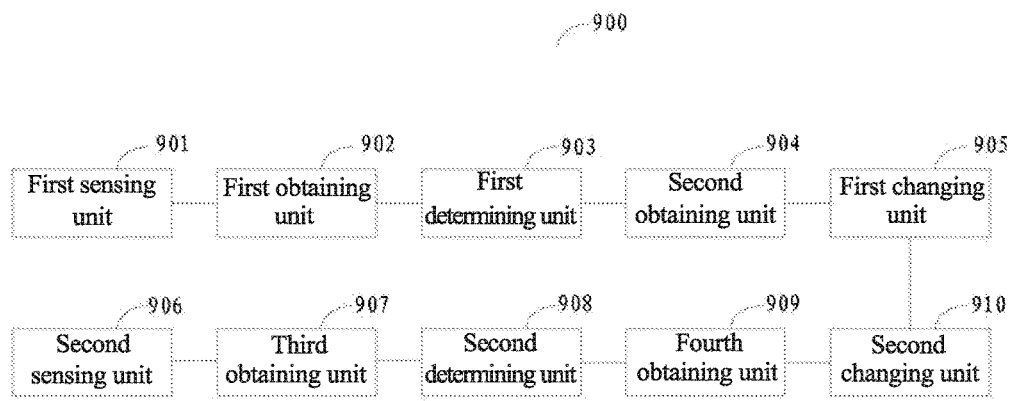
FIG. 9 illustrates a chart diagram of main configurations of a display device according to an embodiment of the present disclosure.
Figure 10:
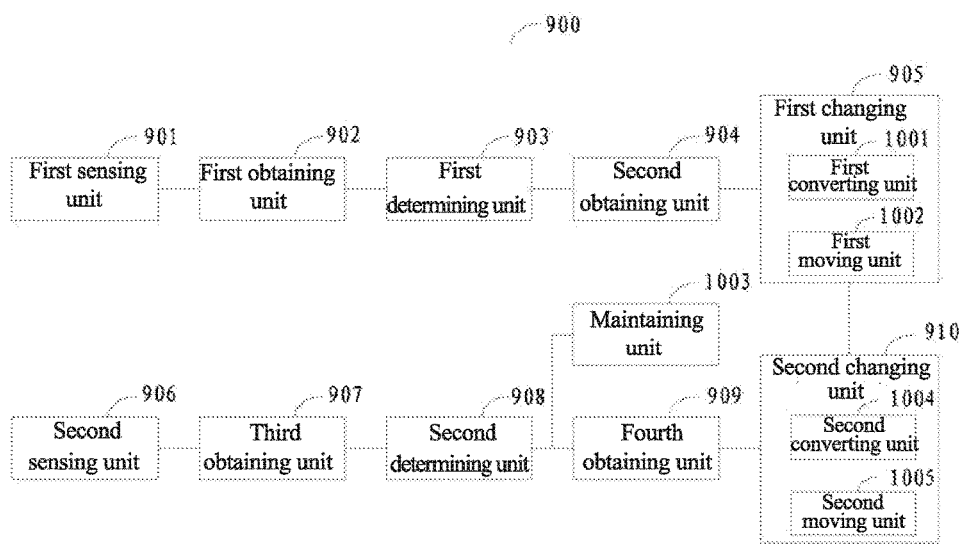
FIG. 10 illustrates a chart diagram of more detailed configurations of a display device according to an embodiment of the present disclosure.

Below will be a description of an illustrative application when the control device moves the display object according to the embodiment of the present disclosure by referring to FIGS. 9 and 10. FIGS. 9 and 10 respectively show display devices 900 and 1000 for implementing the method of moving the display object according to the embodiments of the present disclosure.

The display device is such as a portable mobile terminal, a personal computer and so on. The display device comprises a display unit, and its display area comprises an object display area for displaying the display object. The display object for example comprises a webpage, a picture, a list or other varieties of display controls (such as a sliding block).

In addition, the display device can comprise both a contact sensor and a proximity sensor. The contact sensor is used for sensing the contact of the operation body with the display device, and the proximity sensor is used for sensing the proximity of the operation body to the display device. Alternatively, the display device also can merely comprise the proximity sensor. In this case, the proximity sensor is designed as either being used for sensing the proximity of the operation body to the display device or being used for sensing the contact of the operation body with the display device. Below will be collectively referred to as "sensor" in a case of not needing to particularly distinguish the two.

In addition, the relationship between the display object and the object display area is in the first relative position relationship. As described above, when the area of the display object is smaller than that of the object display area, the relationship between the display object and the object display area being in a first relative position relationship refers to: the display object is displayed at a first position of the object display area. When the area of the display object is larger than that of the object display area, the relationship between the display object and the object display area being in a first relative position relationship refers to: a first part of the display object is displayed in the object display area.

As shown in FIGS. 9 and 10, a display device 900 comprises: a first sensing unit 901, a first obtaining unit 902, a first determining unit 903, a second obtaining unit 904, a first changing unit 905, a second sensing unit 906, a third obtaining unit 907, a second determining unit 908, a fourth obtaining unit 909 and a second changing unit 910.

In particular, the first sensing unit 901 is for example the above contact sensor for sensing a first operation of an operation body relative to the display device. The operation body is for example a finger tip of a finger, a pen point of a touch pen for the user's operation. The first sensing unit 901 senses a first series of track points constituted of multiple track points formed by the operation body on the display device, so as to sense the first operation performed by the operation body on the display device.

The first obtaining unit 902 obtains a first distance between the operation body and the display device according to the sensing result of the first sensing unit 901.

The first determining unit 903 determines whether the first distance is smaller than or equal to a first detection distance. The first detection distance is a threshold set for the display device recognizing the first operation as a contact operation, and its value is appropriately set by those skilled in the art according to the needs.

The second obtaining unit 904 obtains a first operation parameter and a second operation parameter of the operation body according to the first operation when it is determined that the first distance is smaller than or equal to the first detection distance, wherein the first operation parameter differs from the second operation parameter. In particular, as described above, the first sensing unit 901 is able to obtain a first series of track points of the first operation. The second obtaining unit 904 can obtain the first operation parameter and the second operation parameter of the operation body through the first series of track points.

More particularly, the second obtaining unit 904 can obtain the movement direction of the first operation through the positions of the first track point and the last track point in the first series of track points as the first operation parameter. Of course, in a case of the display device being in support of a relatively high operational capability, in order to enhance accuracy, the second obtaining unit 904 also can obtain the real-time movement direction of the first operation through any two of track points (adjacent) in the first series of track points as the first operation parameter.

In addition, the second obtaining unit 904 also can obtain a second operation parameter being different from the first operation parameter. For example, the second obtaining unit 904 can obtain a movement distance of the first operation through the positions of the first track point and the last track point in the first series of track points as the second operation parameter. Alternatively, the second obtaining unit 904 can obtain operation time of the first operation through timing of a system clock in the display device as the second operation parameter. Alternatively, the second obtaining unit 904 can obtain a speed of the first operation through the positions of the first track point and the last track point in the first series of track points as well as the timing of the system clock as the second operation parameter. Of course, similarly, the second obtaining unit 904 can obtain a real-time speed of the first operation through any two of track points (adjacent) in the first series of track points as well as the timing of the system clock in the display device as the second operation parameter.

The first changing unit 905 changes the relationship between the display object and the object display area from the first relative position relationship into a second relative position relationship based on the first operation parameter and the second operation parameter.

In particular, the first changing unit 905 can comprise a first converting unit 1001 as shown in FIG. 10 for respectively converting the first operation parameter and the second operation parameter into a first movement parameter and a second movement parameter of the display object, and a first moving unit 1002 for moving the display object based on the first movement parameter and the second movement parameter to change the relationship between the display object and the object display area from the first relative position relationship into the second relative position relationship.

More particularly, for example, the first converting unit 1001 converts the movement direction of the first operation into the movement direction of the display object as the first movement parameter. For example, the first converting unit 1001 can set the direction same with or opposite to the movement direction of the first operation as the movement direction of the display object. In the below description, it is assumed that the movement direction of the display object is the same with that of the first operation.

For another example, the first converting unit 1001 converts the movement distance of the first operation into a first movement distance of the display object as the second movement parameter. For example, the first converting unit 1001 can add the movement distance of the first operation with one coefficient to obtain the first movement distance of the display object. The coefficient is appropriately set by those skilled in the art according to the needs. For example, the coefficient can be set as zero. Of course, the conversion modes described above are just for illustration. Those skilled in the art can understand that the first converting unit 1001 can obtain the first movement distance of the display object through converting the movement distance of the first operation by other modes (for example multiplying by one coefficient or through a piecewise function and so on) as the second movement parameter.

Alternatively, the first converting unit 1001 converts the operation time of the first operation into the first movement time of the display object as the second movement parameter. In order to conform to the user's operation habit, preferably, the first converting unit 1001 sets the operation time of the first operation as the first movement time of the display object. Of course, those skilled in the art can also obtain the first movement time of the display object through an appropriate arithmetic transformation of the operation time of the first operation, details omitted.

Alternatively, the first converting unit 1001 converts the speed of the first operation into the first movement speed of the display object as the second movement parameter. For example, the first converting unit 1001 can preset a piecewise function. When the speed of the first operation falls into $[0, v_1)$, the first converting unit 1001 sets the first movement speed of the display object as $V_1$; when the speed of the first operation falls into $[v_1, v_2)$, the first converting unit 1001 sets the first movement speed of the display object as $V_2$; ... when the speed of the first operation falls into $[v_{n-1}, v_n)$, the first converting unit 1001 sets the first movement speed of the display object as $V_n$. Values of the $v_1, v_2 \ldots$ $v_{n-1}, v_n$ and $V_1, V_2 \ldots V_n$ can be appropriately set by those skilled in the art according to the needs. Of course, similar to the above, those skilled in the art can understand that the first converting unit 1001 can obtain the first movement distance of the display object through converting the movement distance of the first operation by other modes (for example multiplying by one coefficient or adding with one coefficient and so on) as the second movement parameter.

After that, the first moving unit 1002 moves the display object based on the first movement parameter and the second movement parameter, such that the relationship between the display object and the object display area is changed from the first relative position relationship into the second relative position relationship.

More particularly, for example, the first moving unit 1002 can compare the area of the display object with the area of the object display area. When the area of the display object is smaller relative to the area of the object display area, the first moving unit 1002 moves the display object from the first position to a second position of the object display area based on the movement direction of the display object and further based on at least one of the first movement distance, the first movement time and the first movement speed of the display object, wherein the second position differs from the first position.

On the other hand, when the area of the display object is larger than or equal to the area of the object display area, the first moving unit 1002 moves the display object based on the movement direction of the display object and further based on at least one of the first movement distance, the first movement time and the first movement speed of the display object, so as to display a second part of the display object on the object display area. It needs to point out that the second part and the first part are at most partially overlapped.

The second sensing unit 906 is for example the proximity sensor for sensing the second operation of the operation body relative to the display device. In particular, the second sensing unit 906 senses the second series of track points formed from the projection of the operation body on the display device, so as to sense the second operation performed by the operation body on the display device. In addition, the second sensing unit 906 and the first sensing unit 901 can either be separately set as two units or be combined into one unit.

The third obtaining unit 907 obtains the second distance between the operation body and the display device according to the second operation. In addition, preferably, the third obtaining unit 907 obtains the second distance between the operation body and the display device at a predetermined timing. The predetermined timing is appropriately determined by those skilled in the art according to the needs. For example, the predetermined timing can be set as 3 ms, 5 ms and so on. Thus, the third obtaining unit 907 obtains in real time the real-time range between the operation body and the display device in the second operation.

The second determining unit 908 determines whether the second distance is greater than the first detection distance and smaller than or equal to the second detection distance. The second detection distance is a threshold set for recognizing the second operation as the proximity operation, details omitted.

In addition, preferably, the display device further can comprise a maintaining unit 1003 as shown in FIG. 10. When the third obtaining unit 907 continuously obtains the second distance at the predetermined timing, the maintaining unit 1003 can maintain the relative position relationship between the display object and the object display area unchanged at the moment when the second determining unit 908 determines that the second distance is smaller than or equal to the first detection distance or greater than the second detection distance.

The fourth obtaining unit 909 obtains a third operation parameter of the operation body being different from the first operation parameter according to the second operation, when it is determined that the second distance is greater than the first detection distance and smaller than or equal to the second detection distance.

In particular, as described above, the second sensing unit 906 is able to obtain the second series of track points formed from the projection of the second operation on the display device. The fourth obtaining unit 909 can obtain the third operation parameter of the operation body through the second series of track points.

More particularly, for example, the fourth obtaining unit 909 can obtain the movement distance of the second operation through the positions of the first track point and the last track point in the second series of track points as the third operation parameter. Alternatively, the fourth obtaining unit 909 can obtain operation time of the second operation through the timing of the system clock in the display device as the third operation parameter. Of course, the fourth obtaining unit 909 can further obtain a speed of the second operation through the movement distance of the second operation and the operation time of the second operation obtained above as the third operation parameter.

The second changing unit 910 changes the relationship between the display object and the object display area from the second relative position relationship into a third relative position relationship based on the first operation parameter and the third operation parameter.

In particular, the second changing unit 910 can comprise a second converting unit 1004 as shown in FIG. 10 for converting the third operation parameter into the third movement parameter of the display object, and a second moving unit 1005 for moving the display object based on the first movement parameter and the third movement parameter to change the relationship between the display object and the object display area from the second relative position relationship into the third relative position relationship.

The second converting unit 1004 firstly converts the third operation parameter into the third movement parameter of the display object.

More particularly, the second converting unit 1004 converts the movement distance of the second operation into the second movement distance of the display object as the third movement parameter. For example, the second converting unit 1004 can add the movement distance of the second operation with one coefficient to obtain the movement distance of the display object. The coefficient is appropriately set by those skilled in the art according to the needs. Preferably, the coefficient can be set as being greater than zero. Thus, the user can move the display object a relatively long distance through a relatively short movement distance of operation. Of course, the conversion modes described above are just for illustration. Those skilled in the art can understand that the second converting unit 1004 can obtain the second movement distance of the display object through converting the movement distance of the second operation by other modes (for example multiplying by one coefficient or through a piecewise function and so on) as the third movement parameter.

Alternatively, the second converting unit 1004 converts the operation time of the second operation into the second movement time of the display object as the third movement parameter. In order to conform to the user's operation habit, preferably, the second converting unit 1004 sets the operation time of the second operation as the second movement time of the display object. Of course, those skilled in the art can also obtain the second movement time of the display object through an appropriate arithmetic transformation of the operation time of the second operation, details omitted.

Alternatively, the second converting unit 1004 converts the speed of the second operation into the second movement speed of the display object as the third movement parameter. Similar to the above, those skilled in the art can understand that the second converting unit 1004 can obtain the second movement speed of the display object through converting the speed of the second operation by other modes (for example multiplying by one coefficient, adding with one coefficient or through a piecewise function and so on) as the third movement parameter.

After that, the second moving unit 1005 moves the display object based on the first movement parameter and the third movement parameter, such that the relationship between the display object and the object display area changes from the second relative position relationship into the third relative position relationship.

More particularly, for example, the second moving unit 1005 can make a reference to the relationship between the area of the display object and the area of the object display area obtained from the first moving unit 1002. When the area of the display object is smaller relative to the area of the object display area, the second moving unit 1005 moves the display object from the second position to a third position of the object display area based on the movement direction of the display object and further based on at least one of the second movement distance, the second movement time and the second movement speed of the display object, wherein the third position differs from the second position. On the other hand, when the area of the display object is larger than or equal to the area of the object display area, the second moving unit 1005 moves the display object based on the movement direction of the display object and further based on at least one of the second movement distance, the second movement time and the second movement speed of the display object, so as to display a third part of the display object on the object display area. It needs to point out that the third part and the second part are at most partially overlapped.

In the embodiment described above, the second series of track points sensed by the second sensing unit 906 comprises a plurality of track points. In other words, the operation body performs the second operation in a manner of sliding above the display device. Alternatively, the second series of track points sensed by the second sensing unit can merely comprise a single track point. In other words, the operation can hang in the air and stay above the display device. In this case, likewise, the second moving unit 1005 moves the display object based on the movement direction of the display object and second movement time of the display object as described above, such that the relationship between the display object and the object display area changes from the second relative position relationship into a third relative position relationship.

Preferably, in this case, the fourth obtaining unit 909 further can further obtain the second distance and the second changing unit 910 controls the second movement speed of the display object based on the second distance. For example, the second changing unit 910 can preset a piecewise function. When the second distance falls into $(d_0, d_1]$, the second changing unit 910 sets the second movement speed of the display object as $V'_1$; when the second distance falls into $(d_1, d_2]$, the second changing unit 910 sets the second movement speed of the display object as $V'_2$; . . . when the second distance falls into $(d_{n-1}, d_n]$, the second changing unit 910 sets the second movement speed of the display object as $V'_n$. Values of the $d_1, d_2 \ldots d_{n-1}, d_n$ and $V'_1, V'_2 \ldots V'_n$ can be appropriately set by those skilled in the art according to the needs. It needs to be noted that $d_0$ corresponds to the first detection distance, and $d_n$ corresponds to the second detection distance. Of course, similar to the above, those skilled in the art can understand that the second changing unit 910 can obtain the second movement speed of the display object through converting the second distance by other modes (for example multiplying by one coefficient and so on). Thus, the user can control the movement speed of the display object through adjusting the distance between the operation body and the display device, and can intuitively recognize the relationship between the distance and the movement speed of the display object while adjusting, so as to be able to accurately and quickly display the desired content on the object display area.

In addition, preferably, the second changing unit 910 can comprise a determination unit (not shown) for determining the movement distance and the movement direction of the display object based on the first operation parameter and the third operation parameter; a third determining unit (not shown) for determining whether the moved display object will be in the boundary-exceeding status based on the movement distance; and a third moving unit (not shown) for moving the display object until the display object is in the boundary status when the third determining unit determines that the moved display object will be in the boundary-exceeding status, which is taken as the third relative position relationship between the display object and the object display area.

The above describes the display device according to the embodiment of the present disclosure. In the display device according to the embodiment of the present disclosure, the contact sensing is performed through the first sensing unit, and the proximity sensing is performed through the second sensing unit, thus a corresponding process is performed according to the result of the contact sensing and the proximity sensing, such that the user is able to operate with a simple gesture conforming to operating habits (in particular, the gesture of firstly contacting and sliding, and then hanging in the air and staying, or the gesture of firstly contacting and sliding, and then hanging in the air and sliding) to expediently control the display device to perform the corresponding operation, so as to improve experience of the user.

Figure 11:
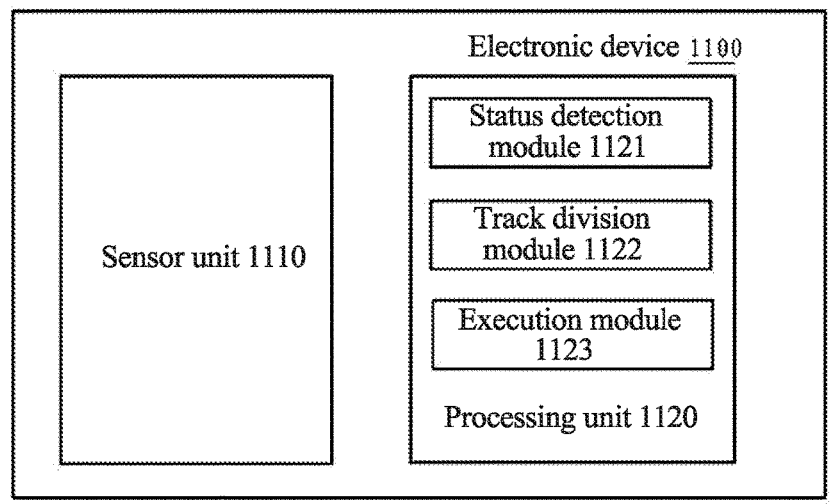
FIG. 11 shows a demonstrative structure block diagram of an electronic device according to an embodiment of the present disclosure.

Below will be a specification of an electronic device according to the embodiment of the present disclosure by referring to FIG. 11. FIG. 11 shows a demonstrative structure block diagram of an electronic device 100 according to an embodiment of the present disclosure. As shown in FIG. 11, a control device 1100 of the present embodiment comprises a sensor unit 1110 and a processing unit 1120.

In particular, the sensor unit 1110 has a first detection distance and a second detection distance. As described above, the sensor unit can comprise one or more of proximity sensor elements such as an infrared sensor element, an ultrasonic sensor element, a capacitive sensor element and so on. The sensor unit 1110 can detect a 3D movement track when a relative distance of the operation body relative to the electronic device is smaller than the first detection distance. The first detection distance and the second detection distance are distances relative to the electronic device and the second detection distance is smaller than the first detection distance. The 3D movement track is a continuous movement track having one end between the first and the second detection distances and the other end equal to or smaller than the second detection distance.

As described above, in some cases, the operation body may reach from the first detection distance to the second detection distance, and comes back from the second detection distance to the first detection distance after moving a track at the second detection distance. At this time, a starting point and an ending point of the 3D movement track can be determined according to requirements of the current operation, that is, determining, according to the requirements of the current operation, whether the 3D movement track should be a track of the operation body reaching from the first detection distance to the second detection distance and moving at the second detection distance or a track of the operation body moving at the second detection distance and coming back from the second detection distance to the first detection distance. That is, when the operation body reaches the first detection distance, the sensor unit 1110 starts to detect the 3D movement track of the operation body until the operation body leaves from the second detection distance after having reached the second detection distance; or when the operation body is at the second detection distance or at a position below the second detection distance, the sensor unit 1110 starts to detect the 3D movement track of the operation body until the operation body comes back from the second detection distance to the first detection distance. In the present embodiment, the second track can be a point at the second detection distance relative to the electronic device, or a continuous movement track constituted of multiple points at the second detection distance or lower than the second detection distance.

The first detection distance of the sensor unit 1110 can be preset by a device provider or the user. Alternatively, the sensor unit 1110 can set the first detection distance according to the operation of the user. In particular, the sensor unit 1110 can set the distance of a fixed position relative to the electronic device as the first detection distance when it is detected that the time of the operation body staying at the fixed position exceeds a predetermined time.

Similar to the first detection distance, the second detection distance of the sensor unit 1110 can be preset by a device provider or the user. Alternatively, the sensor unit 1110 can further set the second detection distance according to the operation of the user. In particular, the sensor unit 1110 sets the distance of a fixed position relative to the electronic device smaller than the first detection distance as the second detection distance, when it is detected that the time of the operation body staying at the fixed position exceeds a predetermined time. As described above, the second detection distance of the sensor unit can be set as zero. That is, when the operation body is at the second detection distance, the electronic device can be contacted.

According to one embodiment of the present disclosure, the 3D movement track is a movement track of monotonously decreasing or increasing of a relative distance relative to the electronic device. That is, the 3D movement track is a continuous movement track that the operation body gets close to and reaches the position equal to or smaller than the second detection distance from the first detection height, or that the operation body moves away from the position equal to or smaller than the second detection distance and reaches the first detection height.

The processing unit 1120 can comprise a status detection module 1121, a track division module 1122 and an execution module 1123. The status detection module 1121 can generate a status change signal when the operation body gets close to the second detection distance of the sensor unit or moves away from the second detection distance. The track division module 1122 can divide a 3D movement track according to the status change signal generated by the status detection module 1121 to obtain a first track when the relative distance is equal to or smaller than the second detection distance and a second track when the relative distance is greater than the second detection distance. The execution module 1123 can execute a corresponding control command according to the first track and the second track.

In the electronic device of the present embodiment, the control command can be executed through detecting the 3D movement track in the process of the operation body getting close to or moving away from the electronic device and combining the 3D movement track in the process of the operation body getting close to or moving away from the electronic device with the operation performed by the operation body on the sensor unit or performed at a position with a predetermined height away from the electronic device, such that a more accurate touch operation can be realized, so as to obtain a better interactive experience.

Below is a description of another example of an electronic device 1200 according to the present disclosure by referring to FIG. 12.

Figure 12:
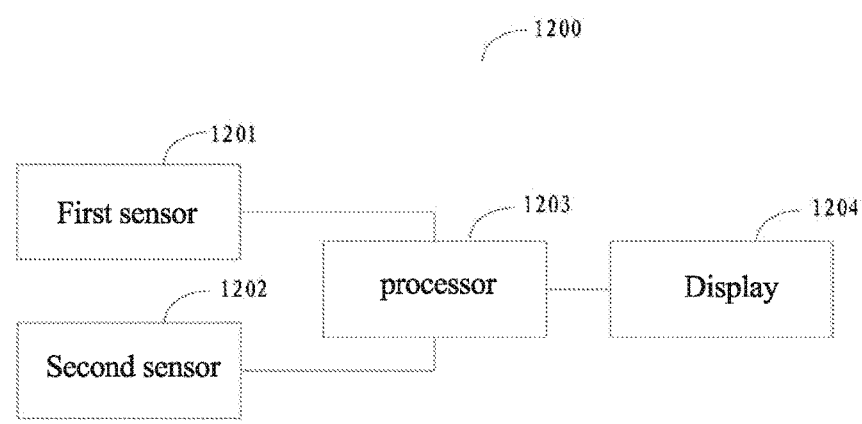
FIG. 12 illustrates a chart diagram of main configurations of an electronic device according to another embodiment of the present disclosure.

As shown in FIG. 12, the electronic device 1200 comprises: a first sensor 1201, a second sensor 1202, a processor 1203 and a display 1204. The first sensor 1201, the second sensor 1202, the processor 1203 and the display 1204 can be communicatively coupled to each other.

The display area of the display 1204 comprises an object display area. The object display area is used for displaying a display object, and the relationship between the display object and the object display area is in a first relative position relationship.

The first sensor 1201 is for example a contact sensor for sensing a first operation of an operation body relative to the electronic device. The second sensor 1202 is for example a proximity sensor for sensing a second operation of the operation body relative to the electronic device. The first sensor 1201 and the second 1202 can either be separately set as two units or be combined into one unit.

The processor 1203 is for example a central processing unit or a micro processor being configured to: obtain a first distance between the operation body and the electronic device according to the first operation; determine whether the first distance is smaller than or equal to a first detection distance; obtain a first operation parameter and a second operation parameter of the operation body according to the first operation when it is determined that the first distance is smaller than the first detection distance, wherein the first operation parameter differs from the second operation parameter; change the relationship between the display object and the object display area from the first relative position relationship into a second relative position relationship based on the first operation parameter and the second operation parameter; obtain a second distance between the operation body and the display device according to the second operation; determine whether the second distance is greater than the first detection distance and smaller than the second detection distance; obtain a third operation parameter of the operation body being different from the first operation parameter according to the second operation when it is determined that the second distance is greater than the first detection distance and smaller than the second detection distance; and change the relationship between the display object and the object display area from the second relative position relationship into a third relative position relationship based on the first operation parameter and the third operation parameter.

The specific processing of the processor 1203 has been described in detail in the control method according to the embodiment of the present disclosure by referring to FIG. 3, details omitted.

The above describes the electronic device according to the embodiment of the present disclosure. In the electronic device according to the embodiment of the present disclosure, the contact sensing is performed through the first sensor, and the proximity sensing is performed through the second sensor, thus a corresponding process is performed according to the result of the contact sensing and the proximity sensing, such that the user is able to operate with a simple gesture conforming to operating habits (in particular, the gesture of firstly contacting and sliding, and then hanging in the air and staying, or the gesture of firstly contacting and sliding, and then hanging in the air and sliding) to expediently control the electronic device to perform the corresponding operation, so as to improve experience of the user.

The above describes the control method and its corresponding control device, the method for moving the display object and its corresponding display device and the electronic device according to the embodiments of the present disclosure by referring to FIGS. 1-12.

It needs to specify that in the present specification, the terms of "include", "comprise" or any other variants have a meaning of covering non-exclusive inclusion, such that a process, method, object or device including a series of elements not only comprise the elements but also comprise other elements not explicitly listed or further comprise the inherent elements of such process, method, object or device. In a case of no more limitations, the elements defined by the sentence of "comprise/include a . . . " does not exclude that there are still additional same elements in the process, method, object or device comprising the elements.

Finally, it further needs to specify that the above series of processes not only comprise processes performed according to time sequence in the order described herein, but also comprise processes performed concurrently or separately performed but not performed according to time sequence.

Through the embodiments described above, those skilled in the art can clearly understand that the present disclosure can be implemented with the aid of software and necessary hardware platform, and of course can be implemented completely through hardware. Based on such understanding, all or part of contributions that the technical solutions of the present disclosure make to the background art can be reflected in a form of a software product, and the computer software product can be stored in a storage medium, such as ROM/RAM, disk, CD and so on, to comprise several instructions for enabling a computer device (may be a personal computer, a server, or a network device and so on) to perform the method as described in each of embodiments or some portions of the embodiments.

In the embodiments of the present disclosure, units/modules can be realized by software, so as to be performed by a variety of processors. For example, an identified executable code module can comprise one or more physical or logical blocks of computer instructions, for example, it can be constructed as an object, process or function. In spite of this, the executable code of the identified module is unnecessary to be physically located together but can comprise different instructions stored at different positions.

When these instructions are logically combined together, they are composed of units/modules and realize the prescribed purpose of the units/modules.

When the units/modules can be realized using software, in consideration of the capability of the existing hardware technology, for the units/modules realized by software, those skilled in the art can construct a corresponding hardware circuit to achieve a corresponding function regardless of the cost. The hardware circuit comprises common very large scale integrated (VLSI) circuits or gate array and the existing semiconductors such as a logic chip, a transistor and so on or other discrete elements. The modules can also be realized by a programmable hardware device such as a field-programmable gate array, a programmable array logic, a programmable logic device and so on.

Those skilled in the art can recognize that in combination of units and algorithmic steps of each example as described in the embodiments of the present disclosure, it can be realized by electronic hardware, computer software or a combination of the two. In order to explicitly specify the interchangeability of hardware and software, components and steps of each example have been generally described according to functions in the above description. Whether these functions are performed by means of hardware or software depends on particular applications and design constraints for the technical solutions. Professionals can use different methods for each particular application to achieve the described function, but such implementation should not be deemed as going beyond the scope of the present disclosure.

Some embodiments of the present disclosure have been illustrated and described. However, those skilled in the art should understand that many modifications can be made to these embodiments without departing from the principle and scope of the present disclosure, and such modifications should be considered as falling into the scope of the present disclosure.

The invention claimed is:

1. A method for moving a display object applied to an electronic device comprising a display unit, wherein a first relationship between the display object and an object display area for displaying the display object in a display area of the display unit is in a first relative position relationship, comprising:
   detecting a first operation of an operation body relative to the electronic device;
   obtaining a first distance between the operation body and the electronic device according to the first operation;
   determining whether the first distance is smaller than or equal to a second detection distance for recognizing a contact operation;
   obtaining a first operation parameter and a second operation parameter according to the first operation when it is determined that the first distance is smaller than or equal to the second detection distance, wherein the first operation parameter differs from the second operation parameter;
   changing the first relationship between the display object and the object display area from the first relative position relationship into a second relative position relationship based on the first operation parameter and a first moving parameter;
   detecting a second operation of the operation body relative to the electronic device after the first relationship between the display object and the object display area is changed from the first relative position relationship into the second relative position relationship;
   obtaining a second distance between the operation body and the electronic device according to the second operation;
   determining whether the second distance is greater than the second detection distance and smaller than or equal to a first detection distance for recognizing a proximity operation;
   obtaining a third operation parameter of the operation body differing from the first operation parameter according to the second operation when it is determined that the second distance is greater than the second detection distance and smaller than or equal to the first detection distance; and
   changing a second relationship between the display object and the object display area from the second relative position relationship into a third relative position relationship based on the first operation parameter and a second moving parameter, wherein the second detection distance is smaller than the first detection distance, the third operation parameter includes movement distance of the operation body in the second operation and operation time of the operation body in the second operation,
   wherein prior to changing the first relationship, the second operation parameter is transformed to the first moving parameter by applying a first coefficient, and prior to changing the second relationship, the third operation parameter is transformed to the second moving parameter by applying a second coefficient, and the first coefficient is different from the second coefficient, and
   wherein the first operation parameter is one of distance, speed, direction, and operation time, the second operation parameter is one of distance, speed, direction, and operation time, the third operation parameter is one of distance, speed, direction, and operation time, the first moving parameter is one of distance, speed, direction, and operation time, and the second moving parameter is one of distance, speed, direction, and operation time.

2. The method as claimed in claim 1, wherein the obtaining the second distance between the operation body and the electronic device according to the second operation comprises:
   obtaining the second distance between the operation body and the electronic device according to the second operation at a predetermined timing.

3. The method as claimed in claim 2, further comprising:
   at a moment when it is determined that the second distance is smaller than or equal to the second detection distance or greater than the first detection distance, maintaining the relative position relationship between the display object and the object display area at the moment unchanged.

4. The method as claimed in claim 1, wherein when an area of the display object is smaller than that of the object display area, the relationship between the display object and the object display area is in a first relative position relationship refers to: the display object is displayed at a first position of the object display area;
   the changing the first relationship between the display object and the object display area from the first relative position relationship into the second relative position relationship comprises: moving the display object from the first position to a second position of the object display area, wherein the second position differs from the first position;
   the changing the second relationship between the display object and the object display area from the second relative position relationship into the third relative position relationship comprises: moving the display object from the second position to a third position of the object display area, wherein the third position differs from the second position.

5. The method as claimed in claim 1, wherein when an area of the display object is larger than that of the object display area, the first relationship between the display object and the object display area is in a first relative position relationship refers to: a first part of the display object is displayed on the object display area;
the changing the first relationship between the display object and the object display area from the first relative position relationship into the second relative position relationship comprises: moving the display object to display a second part of the display object on the object display area, wherein the second part and the first part are at most partially overlapped;
the changing the second relationship between the display object and the object display area from the second relative position relationship into the third relative position relationship comprises: moving the display object to display a third part of the display object on the object display area, wherein the third part and the second part are at most partially overlapped.

6. The method as claimed in claim 1, wherein the changing the second relationship between the display object and the object display area from the second relative position relationship into the third relative position relationship comprises:
determining movement distance and movement direction of the display object based on the first operation parameter and the second moving parameter;
determining whether the display object after being moved will be in a boundary-exceeding status based on the movement distance; and
when it is determined that the display object after being moved will be in the boundary-exceeding status, moving the display object until the display object is in a boundary status, which is taken as the third relative position relationship between the display object and the object display area;
wherein when an area of the display object is smaller than that of the object display area, the boundary-exceeding status is: a first object boundary corresponding to the movement direction in the display object exceeds the object display area; the boundary status is: the first object boundary coincides with a first display boundary corresponding to the movement direction in the object display area; and
when an area of the display object is greater than or equal to that of the object display area, the boundary-exceeding status is: a second object boundary reversely corresponding to the movement direction in the display object is located in the object display area; the boundary status is: the second object boundary coincides with a second display boundary reversely corresponding to the movement direction in the object display area.

7. A display device having a display area comprising an object display area for displaying a display object, a first relationship between the display object and the object display area being in a first relative position relationship, the display device comprising:
a processing unit; and
a memory unit, storing a computer program thereon to be executed by the processing unit to achieve the following steps:
a first sensing step for sensing a first operation of an operation body relative to the display device;
a first obtaining step for obtaining a first distance between the operation body and the display device according to the first operation;
a first determining step for determining whether the first distance is smaller than or equal to a second detection distance for recognizing a contact operation;
a second obtaining step for obtaining a first operation parameter and a second operation parameter of the operation body according to the first operation when it is determined that the first distance is smaller than or equal to the second detection distance, wherein the first operation parameter differs from the second operation parameter;
a first changing step for changing the first relationship between the display object and the object display area from the first relative position relationship into a second relative position relationship based on the first operation parameter and a first moving parameter;
a second sensing step for sensing a second operation of the operation body relative to the display device after the first relationship between the display object and the object display area is changed from the first relative position relationship into the second relative position relationship;
a third obtaining step for obtaining a second distance between the operation body and the display device according to the second operation;
a second determining step for determining whether the second distance is greater than the second detection distance and smaller than or equal to a first detection distance for recognizing a proximity operation;
a fourth obtaining step for obtaining a third operation parameter of the operation body different from the first operation parameter according to the second operation when it is determined that the second distance is greater than the second detection distance and smaller than or equal to the first detection distance; and
a second changing step for changing a second relationship between the display object and the object display area from the second relative position relationship into a third relative position relationship based on the first operation parameter and a second moving parameter,
wherein the second detection distance is smaller than the first detection distance, the third operation parameter includes movement distance of the operation body in the second operation and operation time of the operation body in the second operation,
wherein prior to the first changing step, the second operation parameter is transformed to the first moving parameter by applying a first coefficient, and prior to the second changing step, the third operation parameter is transformed to the second moving parameter by applying a second coefficient, and the first coefficient is different from the second coefficient, and
wherein the first operation parameter is one of distance, speed, direction, and operation time, the second operation parameter is one of distance, speed, direction, and operation time, the third operation parameter is one of distance, speed, direction, and operation time, the first moving parameter is one of distance, speed, direction, and operation time, and the second moving parameter is one of distance, speed, direction, and operation time.

8. The display device as claimed in claim 7, wherein the third obtaining step obtains the second distance between the operation body and the display device according to the second operation at a predetermined timing.

9. The display device as claimed in claim 8, the steps further comprising:
a maintaining step for maintaining the relative position relationship between the display object and the object display area unchanged at the moment when the second determining unit determines that the second distance is smaller than or equal to the second detection distance or greater than the first detection distance.

10. The display device as claimed in claim 7, wherein the second changing step comprises:
a determination step for determining movement distance and movement direction of the display object based on the first operation parameter and the second moving parameter;
a third determining step for determining whether the display object after being moved will be in a boundary-exceeding status based on the movement distance; and
a third moving step for moving the display object until the display object is in the boundary status when the third determining unit determines that the display object after being moved will be in the boundary-exceeding status, which is taken as the third relative position relationship between the display object and the object display area;
wherein when an area of the display object is smaller than that of the object display area, the boundary-exceeding status is: a first object boundary corresponding to the movement direction in the display object exceeds the object display area; the boundary status is: the first object boundary coincides with a first display boundary corresponding to the movement direction in the object display area; and
when an area of the display object is greater than or equal to that of the object display area, the boundary-exceeding status is: a second object boundary reversely corresponding to the movement direction in the display object is located in the object display area; the boundary status is: the second object boundary coincides with a second display boundary reversely corresponding to the movement direction in the object display area.

11. A control method applied to an electronic device comprising a sensor unit to change a first relationship between a display object and an object display area on the electronic device and change a second relationship between the display object and the object display area on the electronic device, wherein the sensor unit has a first detection distance for recognizing a proximity operation and a second detection distance for recognizing a contact operation which are distances relative to the electronic device, and the second detection distance is smaller than the first detection distance, comprising:
detecting a 3D movement track when a relative distance of an operation body relative to the electronic device is smaller than the first detection distance, wherein the 3D movement track is a continuous movement track having one end between the first and the second detection distances and the other end equal to or smaller than the second detection distance;
generating a status change signal when the operation body reaches the second detection distance of the sensor unit or moves away from the second detection distance;
dividing the 3D movement track according to the status change signal to obtain a first track when the relative distance is greater than the second detection distance and a second track when the relative distance is equal to or smaller than the second detection distance; and
executing a corresponding control command according to the first track and the second track,
wherein the detecting the 3D movement track when the relative distance of the operation body relative to the electronic device is smaller than the first detection distance comprises:
detecting a first operation of the operation body relative to the electronic device;
obtaining a first distance between the operation body and the electronic device according to the first operation;
determining whether the first distance is smaller than or equal to the second detection distance;
obtaining a first operation parameter and a second operation parameter of the operation body according to the first operation when it is determined that the first distance is smaller than or equal to the second detection distance, wherein the first operation parameter differs from the second operation parameter;
detecting a second operation of the operation body relative to the electronic device;
obtaining a second distance between the operation body and the electronic device according to the second operation;
determining whether the second distance is greater than the second detection distance and smaller than or equal to the first detection distance; and
obtaining a third operation parameter of the operation body differing from the first operation parameter according to the second operation when it is determined that the second distance is greater than the second detection distance and smaller than or equal to the first detection distance;
the executing the corresponding control command according to the first track and the second track comprises:
changing the first relationship between the display object and the object display area from a first relative position relationship into a second relative position relationship based on the first operation parameter and a first moving parameter; and
changing the second relationship between the display object and the object display area from the second relative position relationship into a third relative position relationship based on the first operation parameter and a second moving parameter,
wherein prior to the changing the first relationship, the second operation parameter is transformed to the first moving parameter by applying a first coefficient, and prior to the changing the second relationship, the third operation parameter is transformed to the second moving parameter by applying a second coefficient, and the first coefficient is different from the second coefficient, and
wherein the first operation parameter is one of distance, speed, direction, and operation time, the second operation parameter is one of distance, speed, direction, and operation time, the third operation parameter is one of distance, speed, direction, and operation time, the first moving parameter is one of distance, speed, direction, and operation time, and the second moving parameter is one of distance, speed, direction, and operation time.

12. The method as claimed in claim 11, wherein the distance of a fixed position relative to the electronic device can be set as the first detection distance when it is detected that the time of the operation body staying at the fixed position exceeds a predetermined time.

13. The method as claimed in claim 11, wherein the distance of a fixed position relative to the electronic device smaller than the first detection distance can be set as the second detection distance when it is detected that the time of the operation body staying at the fixed position exceeds a predetermined time.

14. The method as claimed in claim 11, wherein the 3D movement track is a movement track of monotonously decreasing or increasing of the relative distance.

15. The method as claimed in claim 11, wherein the executing the corresponding control command according to the first track and the second track comprises:
   determining a control command group according to the second track;
   selecting a corresponding control command from the determined control command group according to the first track; and
   executing the selected control command.

16. A control device applied to an electronic device to change a first relationship between a display object and an object display area on the electronic device and change a second relationship between the display object and the object display area on the electronic device, comprising:
   a sensor unit having a first detection distance for recognizing a proximity operation and a second detection distance for recognizing a contact operation and being configured to detect a 3D movement track when a relative distance of an operation body relative to the electronic device is smaller than the first detection distance, wherein the first detection distance and the second detection distance are distances relative to the electronic device, the second detection distance is smaller than the first detection distance, and the 3D movement track is a continuous movement track having one end between the first and the second detection distances and the other end equal to or smaller than the second detection distance;
   a processing unit;
   a memory unit, storing a computer program thereon to be executed by the processing unit to achieve the following steps:
   a status detection step being configured to generate a status change signal when the operation body reaches the second detection distance of the sensor unit or moves away from the second detection distance;
   a track division step being configured to divide the 3D movement track according to the status change signal to obtain a first track when the relative distance is greater than the second detection distance and a second track when the relative distance is equal to or smaller than the second detection distance; and
   an execution step being configured to execute a corresponding control command according to the first track and the second track,
   wherein the steps further comprise:
   a first sensing step for sensing a first operation of the operation body relative to the electronic device;
   a first obtaining step for obtaining a first distance between the operation body and the electronic device according to the first operation;
   a first determining step for determining whether the first distance is smaller than or equal to the second detection distance;

a second obtaining step for obtaining a first operation parameter and a second operation parameter of the operation body according to the first operation when it is determined that the first distance is smaller than or equal to the second detection distance, wherein the first operation parameter differs from the second operation parameter;
   a second sensing step for sensing a second operation of the operation body relative to the electronic device;
   a third obtaining step for obtaining a second distance between the operation body and the electronic device according to the second operation;
   a second determining step for determining whether the second distance is greater than the second detection distance and smaller than or equal to the first detection distance; and
   a fourth obtaining step for obtaining a third operation parameter differing from the first operation parameter according to the second operation when it is determined that the second distance is greater than the second detection distance or smaller than or equal to the first detection distance;
   the execution step comprises:
   a first changing step for changing the first relationship between the display object and the object display area from a first relative position relationship into a second relative position relationship based on the first operation parameter and a first moving parameter; and a second changing step for changing the second relationship between the display object and the object display area from the second relative position relationship into a third relative position relationship based on the first operation parameter and a second moving parameter,
   wherein prior to the first changing step, the second operation parameter is transformed to the first moving parameter by applying a first coefficient, and prior to the second changing step, the third operation parameter is transformed to the second moving parameter by applying a second coefficient, and the first coefficient is different from the second coefficient, and
   wherein the first operation parameter is one of distance, speed, direction, and operation time, the second operation parameter is one of distance, speed, direction, and operation time, the third operation parameter is one of distance, speed, direction, and operation time, the first moving parameter is one of distance, speed, direction, and operation time, and the second moving parameter is one of distance, speed, direction, and operation time.

17. The device as claimed in claim 16, wherein the sensor unit is further configured to set the distance of a fixed position relative to the electronic device as the first detection distance when it is detected that the time of the operation body staying at the fixed position exceeds a predetermined time.

18. The device as claimed in claim 16, wherein the sensor unit is further configured to set the distance of a fixed position relative to the electronic device smaller than the first detection distance as the second detection distance when it is detected that the time of the operation body staying at the fixed position exceeds the predetermined time.

19. The device as claimed in claim 16, wherein
   the second detection distance is zero;
   the 3D movement track is a continuous movement track having one end between the first and the second detection distances and the other end equal to the second detection distance;

the sensor unit comprises:
a first sensor module being configured to detect a movement track of the operation body between the first and the second detection distances; and
a second sensor module being configured to detect a movement track of the operation body at the second detection distance.

20. The device as claimed in claim 16, wherein the execution step comprises:
a command group determination step being configured to determine a control command group according to the second track;
a command selection step being configured to select a corresponding control command from the control command group determined by the command group determination module according to the first track; and
a command execution step being configured to execute the selected control command.

21. An electronic device for changing a first relationship between a display object and an object display area on the electronic device and change a second relationship between the display object and the object display area on the electronic device, comprising:
a sensor unit having a first detection distance for recognizing a proximity operation and a second detection distance for recognizing a contact operation and being configured to detect a 3D movement track when a relative distance of an operation body relative to the electronic device is smaller than the first detection distance, wherein the first detection distance and the second detection distance are distances relative to the electronic device, the second detection distance is smaller than the first detection distance, and the 3D movement track is a continuous movement track having one end between the first and the second detection distances and the other end equal to or smaller than the second detection distance;
a processing unit; and
a memory unit, storing a computer program thereon to be executed by the processing unit to achieve the following steps:
a status detection step being configured to generate a status change signal when the operation body reaches the second detection distance of the sensor unit or moves away from the second detection distance;
a track division step being configured to divide the 3D movement track according to the status change signal to obtain a first track when the relative distance is greater than the second detection distance and a second track when the relative distance is equal to or smaller than the second detection distance; and
an execution step being configured to execute a corresponding control command according to the first track and the second track,
wherein the step further comprises:
a first sensing step for sensing a first operation of the operation body relative to the electronic device;
a first obtaining step for obtaining a first distance between the operation body and the electronic device according to the first operation;
a first determining step for determining whether the first distance is smaller than or equal to the second detection distance;
a second obtaining step for obtaining a first operation parameter and a second operation parameter of the operation body according to the first operation when it is determined that the first distance is smaller than or equal to the second detection distance, wherein the first operation parameter differs from the second operation parameter;
a second sensing step for sensing a second operation of the operation body relative to the electronic device;
a third obtaining step for obtaining a second distance between the operation body and the electronic device according to the second operation;
a second determining step for determining whether the second distance is greater than the second detection distance and smaller than or equal to the first detection distance; and
a fourth obtaining step for obtaining a third operation parameter differing from the first operation parameter according to the second operation when it is determined that the second distance is greater than the second detection distance or smaller than or equal to the first detection distance;
the execution step comprises:
a first changing step for changing the first relationship between the display object and the object display area from a first relative position relationship into a second relative position relationship based on the first operation parameter and a first moving parameter; and
a second changing step for changing the second relationship between the display object and the object display area from the second relative position relationship into a third relative position relationship based on the first operation parameter and a second moving parameter,
wherein prior to the first changing step, the second operation parameter is transformed to the first moving parameter by applying a first coefficient, and prior to the second changing step, the third operation parameter is transformed to the second moving parameter by applying a second coefficient, and the first coefficient is different from the second coefficient, and
wherein the first operation parameter is one of distance, speed, direction, and operation time, the second operation parameter is one of distance, speed, direction, and operation time, the third operation parameter is one of distance, speed, direction, and operation time, the first moving parameter is one of distance, speed, direction, and operation time, and the second moving parameter is one of distance, speed, direction, and operation time.

22. An electronic device, comprising:
a display having a display area comprising an object display area for displaying a display object, a first relationship between the display object and the object display area being in a first relative position relationship;
a first sensor for sensing a first operation of an operation body relative to the electronic device;
a second sensor for sensing a second operation of the operation body relative to the electronic device;
a processor;
wherein the processor is configured to:
obtain a first distance between the operation body and the electronic device according to the first operation;
determine whether the first distance is smaller than a second detection distance for recognizing a contact operation;
obtain a first operation parameter and a second operation parameter of the operation body according to the first operation when it is determined that the first distance is smaller than the second detection distance, wherein the first operation parameter differs from the second operation parameter;

change the first relationship between the display object and the object display area from the first relative position relationship into a second relative position relationship based on the first operation parameter and a first moving parameter;

detect a second operation of the operation body relative to the electronic device after the first relationship between the display object and the object display area is changed from the first relative position relationship into the second relative position relationship;

obtain a second distance between the operation body and the display device according to the second operation;

determine whether the second distance is greater than the second detection distance and smaller than a first detection distance for recognizing a proximity operation;

obtain a third operation parameter of the operation body different from the first operation parameter according to the second operation when it is determined that the second distance is greater than the second detection distance and smaller than the first detection distance; and change a second relationship between the display object and the object display area from the second relative position relationship into a third relative position relationship based on the first operation parameter and a second moving parameter, wherein the second detection distance is smaller than the first detection distance, the third operation parameter includes movement distance of the operation body in the second operation and operation time of the operation body in the second operation, wherein prior to the change the first relationship, the second operation parameter is transformed to the first moving parameter by applying a first coefficient, and prior to the change the second relationship, the third operation parameter is transformed to the second moving parameter by applying a second coefficient, and the first coefficient is different from the second coefficient, and wherein the first operation parameter is one of distance, speed, direction, and operation time, the second operation parameter is one of distance, speed, direction, and operation time, the third operation parameter is one of distance, speed, direction, and operation time, the first moving parameter is one of distance, speed, direction, and operation time, and the second moving parameter is one of distance, speed, direction, and operation time.

* * * * *